(12) United States Patent
Cho et al.

(10) Patent No.: US 10,769,413 B2
(45) Date of Patent: Sep. 8, 2020

(54) MOBILE TERMINAL AND CONTROL METHOD THEREOF

(71) Applicant: LG ELECTRONICS INC., Seoul (KR)

(72) Inventors: Taehoon Cho, Seoul (KR); Sanghyun Eim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 500 days.

(21) Appl. No.: 15/499,820

(22) Filed: Apr. 27, 2017

(65) Prior Publication Data

US 2017/0372285 A1 Dec. 28, 2017

(30) Foreign Application Priority Data

Jun. 23, 2016 (KR) .................. 10-2016-0078837

(51) Int. Cl.
| | |
|---|---|
| G06K 9/00 | (2006.01) |
| G06Q 20/32 | (2012.01) |
| G06Q 30/02 | (2012.01) |
| G06Q 30/06 | (2012.01) |
| G06K 9/22 | (2006.01) |
| G06Q 20/40 | (2012.01) |
| H04W 4/80 | (2018.01) |

(52) U.S. Cl.
CPC ..... G06K 9/00228 (2013.01); G06K 9/00288 (2013.01); G06K 9/00302 (2013.01); G06K 9/00335 (2013.01); G06K 9/22 (2013.01); G06Q 20/322 (2013.01); G06Q 20/3278 (2013.01); G06Q 20/40145 (2013.01); G06Q 30/0201 (2013.01); G06Q 30/0217 (2013.01); G06Q 30/0282 (2013.01); G06Q 30/0631 (2013.01); H04W 4/80 (2018.02)

(58) Field of Classification Search
CPC .......... G06K 9/00228; G06K 9/00288; G06K 9/00302; G06K 9/00335; G06K 9/22; G06Q 20/322; G06Q 20/3278; G06Q 20/40145; G06Q 30/0201; G06Q 30/0217; G06Q 30/0282; G06Q 30/0631; H04W 4/80
See application file for complete search history.

(56) References Cited

U.S. PATENT DOCUMENTS

| | | | |
|---|---|---|---|
| 2011/0142234 A1* | 6/2011 | Rogers | G06F 21/35 380/247 |
| 2014/0365334 A1* | 12/2014 | Hurewitz | G06Q 30/0613 705/26.41 |
| 2019/0303551 A1* | 10/2019 | Tussy | H04W 12/06 |
| 2019/0306137 A1* | 10/2019 | Isaacson | G06F 3/048 |

* cited by examiner

*Primary Examiner* — A. Hunter Wilder
*Assistant Examiner* — Joseph M Mutschler
(74) *Attorney, Agent, or Firm* — Lee, Hong, Degerman, Kang & Waimey

(57) ABSTRACT

A mobile terminal includes a wireless communication unit communicating with a point-of-sales (POS) terminal positioned nearby, and a controller performing, when a payment event regarding goods occurs, payment regarding the goods together with the POS terminal using an image received from the outside, wherein when a facial image corresponding to the image corresponds to a previously registered user, the controller approves payment regarding the goods and generates evaluation information regarding the goods using the facial image included in the received image.

11 Claims, 19 Drawing Sheets

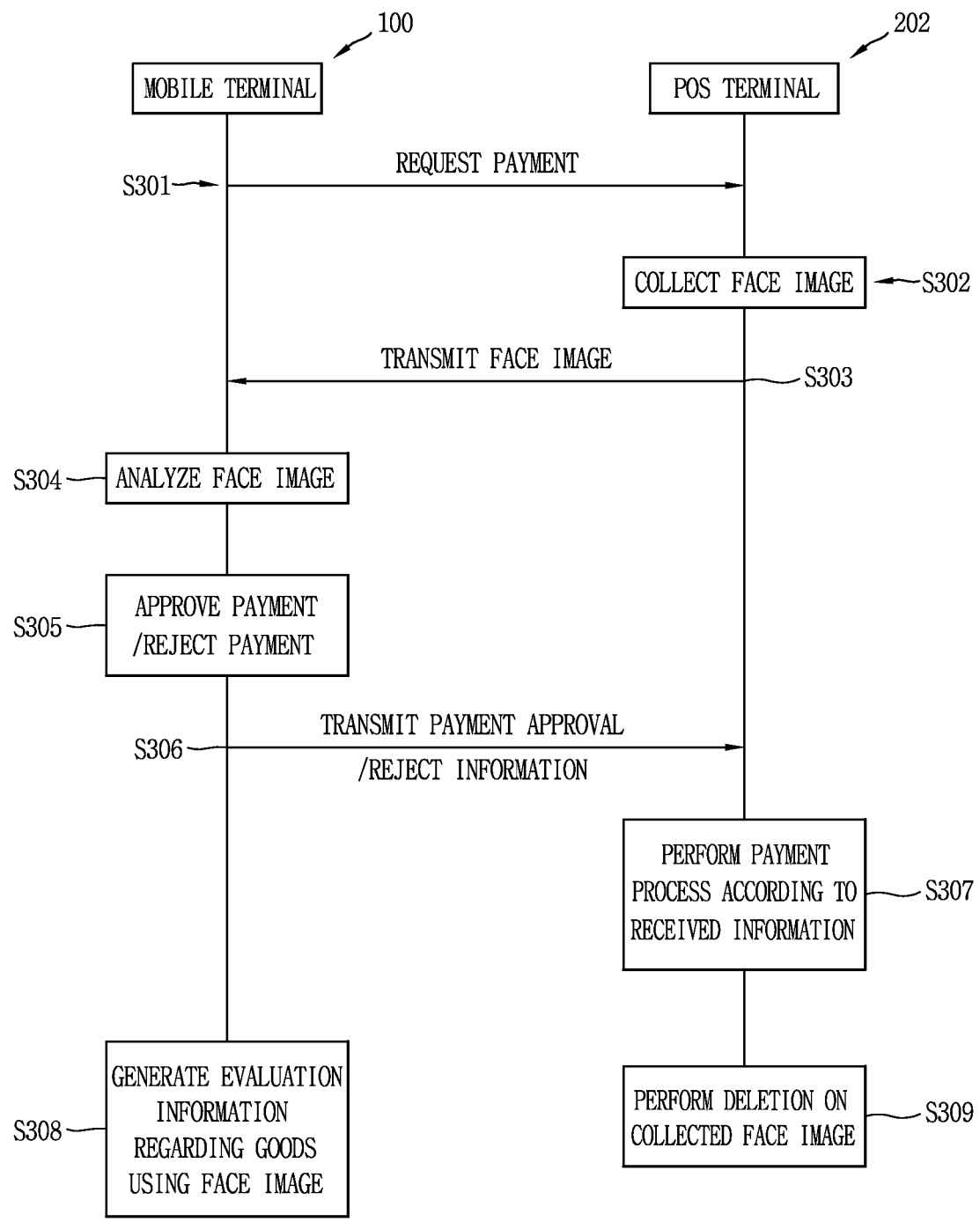

(a)  (b)  (c)  (d)  (e)

FIG. 6A
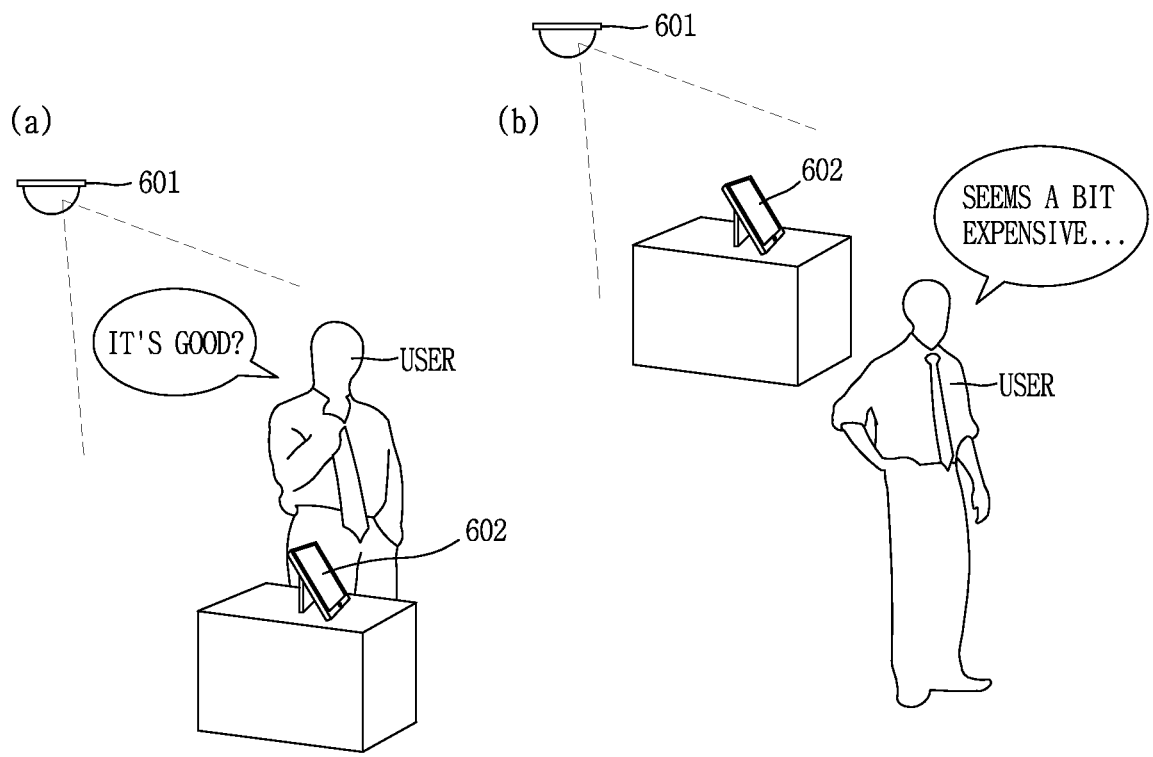
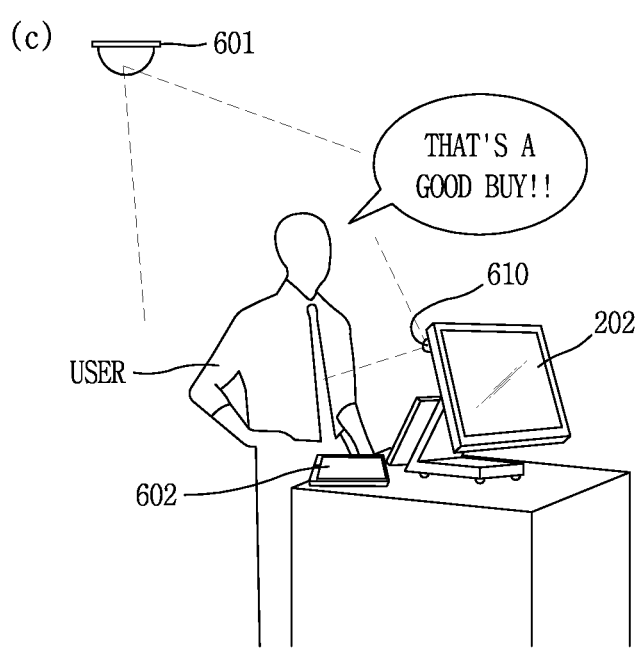

FIG. 6B
(a)
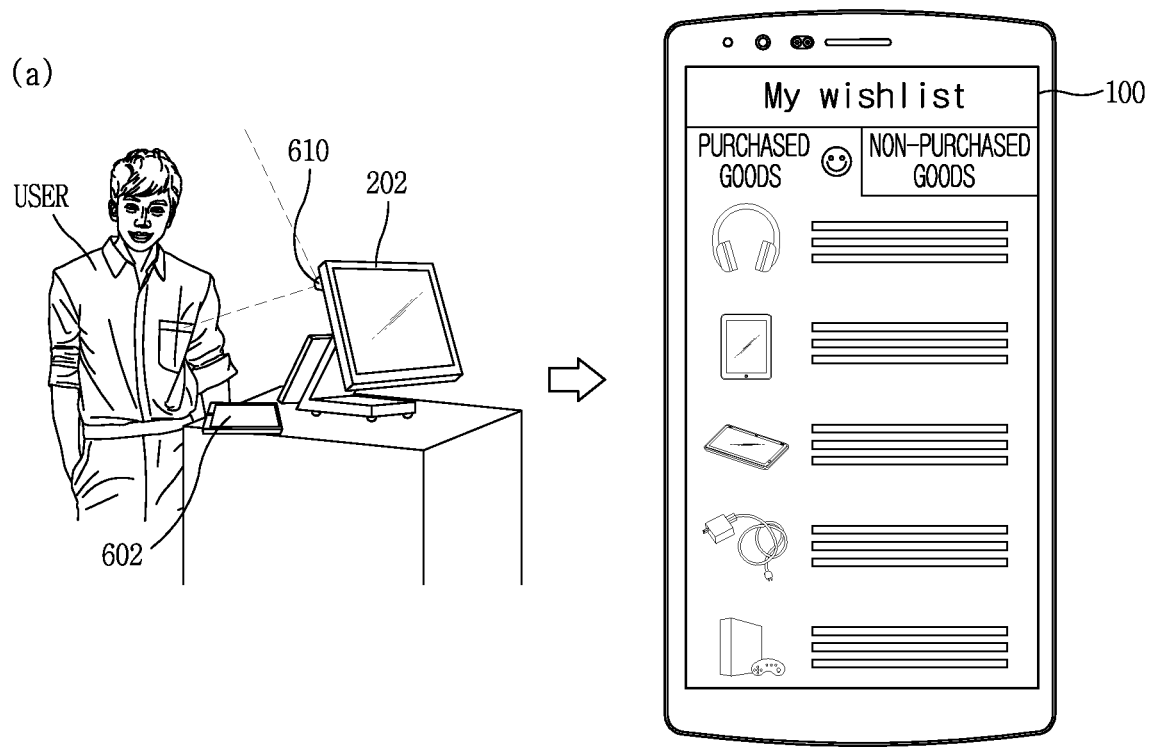
(b)
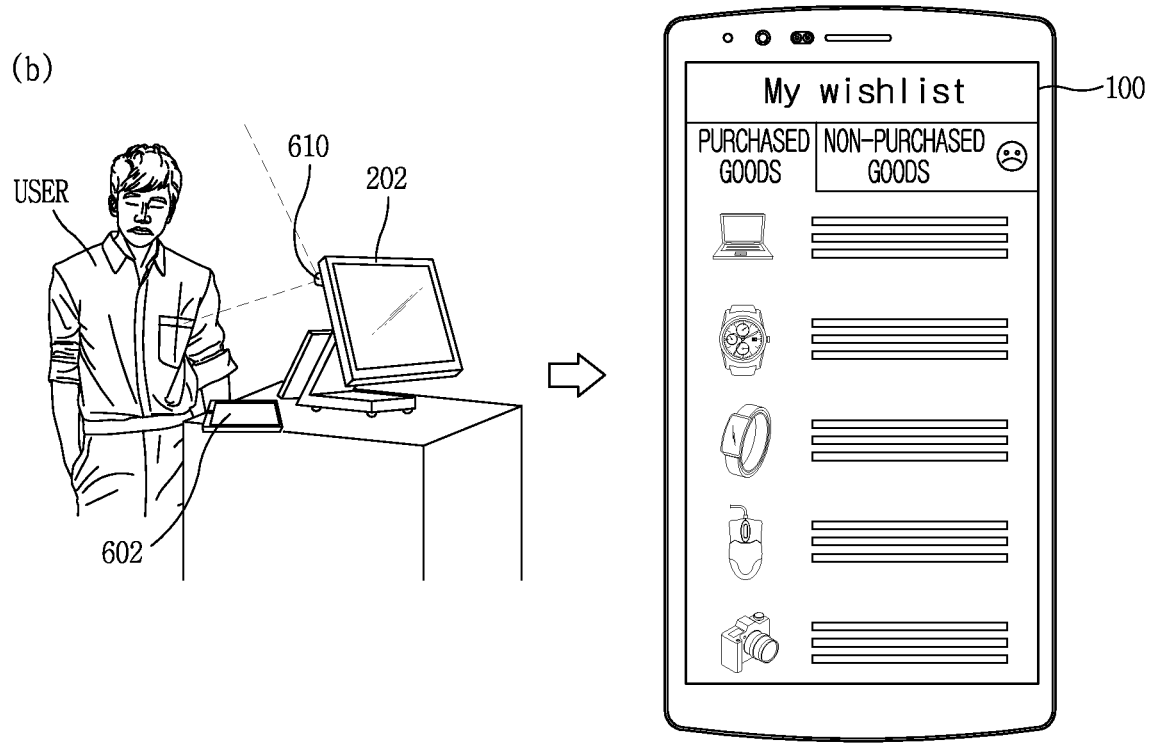

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2016-0078837, filed on Jun. 23, 2016, the contents of which are all hereby incorporated by reference herein in its entirety.

FIELD OF THE INVENTION

The present disclosure relates to a mobile terminal capable of performing electronic payment and a control method thereof.

DESCRIPTION OF THE RELATED ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Meanwhile, recently, as functions of mobile terminals have been diversified, electronic payment is performed using mobile terminal online or offline. Here, mobile terminals are simply used as a means of payment and utilization of various types of information that may be generated in relation to payment is not considered.

SUMMARY OF THE INVENTION

Therefore, an aspect of the detailed description is to provide a method for strengthening security when payment is performed on goods, and a mobile terminal capable of providing meaningful information regarding goods to a user by utilizing information utilized as a means for strengthening security, and a control method thereof.

Another aspect of the detailed description is to provide a mobile terminal capable of providing goods information to a user when gods are searched and purchased, by utilizing various types of information such as user's expression, gesture, body index, and the like, and a control method thereof.

To achieve these and other advantages and in accordance with the purpose of this specification, as embodied and broadly described herein, a mobile terminal includes: a wireless communication unit communicating with a point-of-sales (POS) terminal positioned nearby; and a controller performing, when a payment event regarding goods occurs, payment regarding the goods together with the POS terminal using an image received from the outside, wherein when a facial image corresponding to the image corresponds to a previously registered user, the controller approves payment regarding the goods and generates evaluation information regarding the goods using the facial image included in the received image.

When payment regarding the goods is approved, the controller may analyze the facial image included in the image using a preset face analysis algorithm and obtain facial expression information corresponding to the facial image according to the analysis result, and generating of the evaluation information may include associating the facial information and the information regarding goods.

The generating of the evaluation information regarding the goods may include: obtaining a user's gesture from the image and combining the facial information and the user's gesture to extract feeling information regarding the goods, and matching the extracted feeling information and the information regarding the goods.

The mobile terminal may further include: a camera, wherein the controller may analyze a facial image of a first user obtained through the camera on the basis of the preset face analysis algorithm to extract facial expression information corresponding to the facial image of the first user and feeling information, and output goods information corresponding to evaluation information corresponding to at least one of the extracted facial information of the first user and the feeling information.

The controller may sense that the mobile terminal is positioned in a store on the basis of communication between the wireless communication unit and a wireless communication unit provided in the store in which the POS terminal is positioned, activate at least one of a camera and a microphone as the mobile terminal is sensed to be positioned in the store, and generate evaluation information regarding the goods by using information received through at least one of the camera and the microphone.

The wireless communication unit may receive the goods information from the goods or an NFC tag disposed in the vicinity of the goods, and when a timing at which the goods information was received and a timing at which the information was received through at least one of the camera and the microphone correspond to each other, the wireless communication unit may generate evaluation information regarding the goods using the information received through at least one of the camera and the microphone.

When a time during which the mobile terminal has stayed near the goods satisfies a preset reference, the controller may use the information received through at least one of the camera and the microphone in generating evaluation information regarding the goods.

The image may be captured by a camera provided in the POS terminal and may be an image received from the POS terminal in response to the occurrence of the payment event.

To achieve these and other advantages and in accordance with the purpose of this specification, as embodied and broadly described herein, a mobile terminal includes: a touch screen; a camera; and a controller activating the camera in response to a goods search request, and controlling the camera to obtain a facial image of a user through the activated camera, wherein the controller searches for goods corresponding to evaluation information corresponding to a user's facial expression corresponding to the facial image from a preset database, and outputs the searched goods on the touch screen.

The evaluation information may be classified into a plurality of grades on the basis of a facial expression of a person, and the controller may extract a grade corresponding to the facial image on the basis of a preset face analysis algorithm, and search for goods having evaluation information corresponding to the extracted grade.

The mobile terminal may further include: a microphone, wherein the controller may activate the microphone together with the camera in response to the goods search request, specify a category of search target goods on the basis of a voice received through the microphone, and search for goods having evaluation information corresponding to the extracted grade from goods corresponding to the specified category.

To achieve these and other advantages and in accordance with the purpose of this specification, as embodied and broadly described herein, a payment method of a payment system including a point-of-sales (POS) terminal and a mobile terminal may include: transmitting, by the mobile terminal, a payment request signal to the POS terminal; activating, by the POS terminal, a camera provided in the POS terminal in response to the payment request signal, and capturing an image of a user of the mobile terminal through the activated camera; transmitting, by the POS terminal, the captured image to the mobile terminal; and when a facial image included in the image received from the POS terminal corresponds to a previously registered user, approving, by the mobile terminal, payment on goods purchased through the POS terminal, analyzing, by the mobile terminal, a user's facial expression corresponding to the facial image, and generating evaluation information regarding the goods purchased through the POS terminal on the basis of the analyzed facial expression.

The method may further include: extracting an image positioned in the vicinity of the goods purchased by the user through the POS terminal from at least one of a plurality of cameras disposed in the store, and transmitting the extracted image to the mobile terminal.

To achieve these and other advantages and in accordance with the purpose of this specification, as embodied and broadly described herein, a payment system may include: a plurality of communication units disposed in a store and communicating with a mobile terminal disposed in the store; a plurality of cameras disposed in the store; and a controller detecting goods for which a time during which a user of the mobile terminal has stayed satisfies a preset reference among goods disposed in the store, by using at least one of the plurality of communication units, and extracting an image including the user of the mobile terminal positioned in the vicinity of the goods satisfying the preset reference, among images captured by at least one of the plurality of cameras, wherein when a payment event regarding the goods satisfying the preset reference occurs in the mobile terminal, the controller may transmit the extracted image to the mobile terminal such that evaluation information regarding the goods satisfying the preset reference is generated in the mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 is a flow chart illustrating a payment method according to an embodiment of the present disclosure.

FIGS. 5, 6A, 6B, 6C, and 6D are conceptual views illustrating a method for generating evaluation information in a mobile terminal according to an embodiment of the present disclosure.

DETAILED DESCRIPTION OF THE INVENTION

Figure 1A:
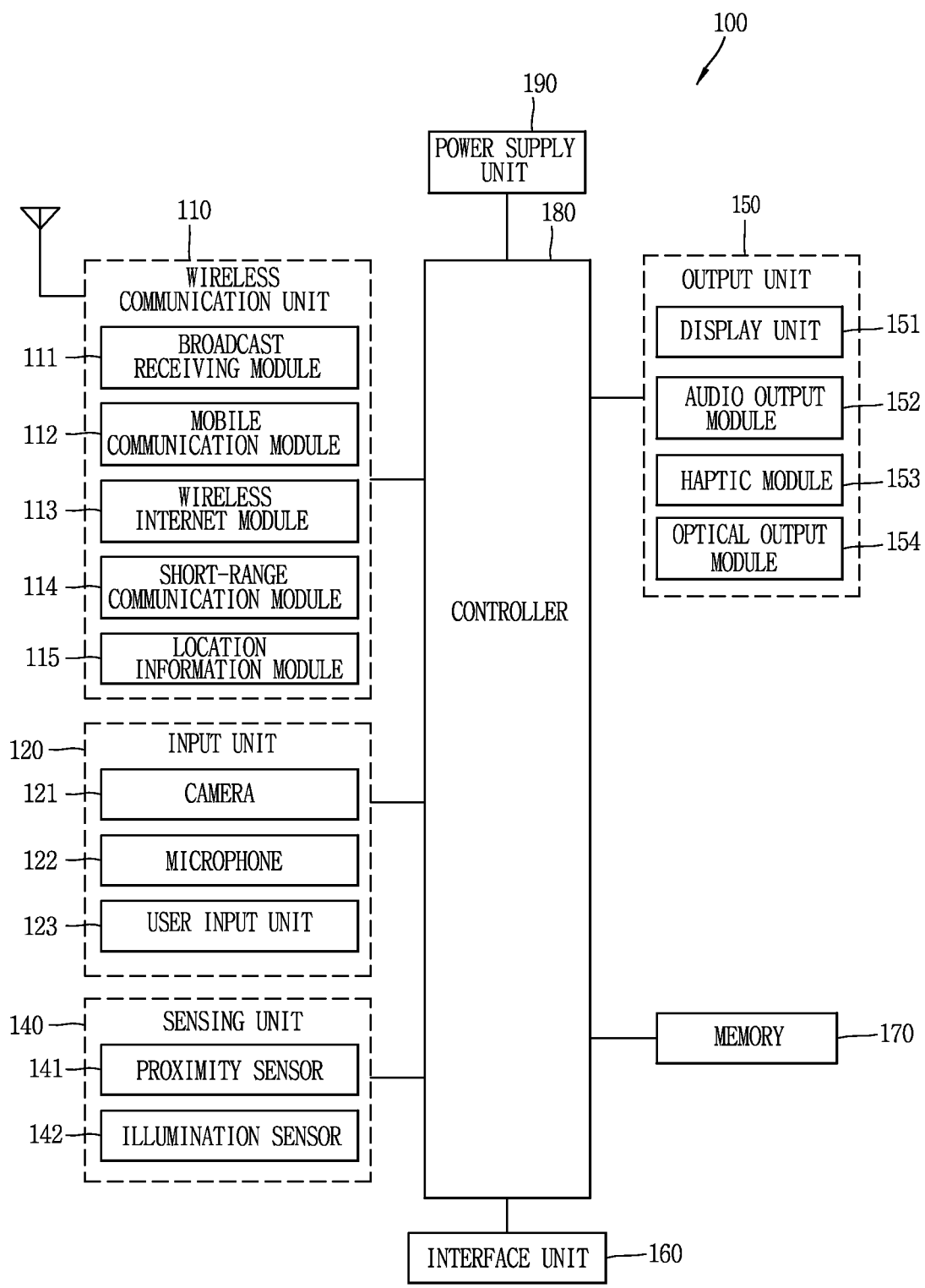
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
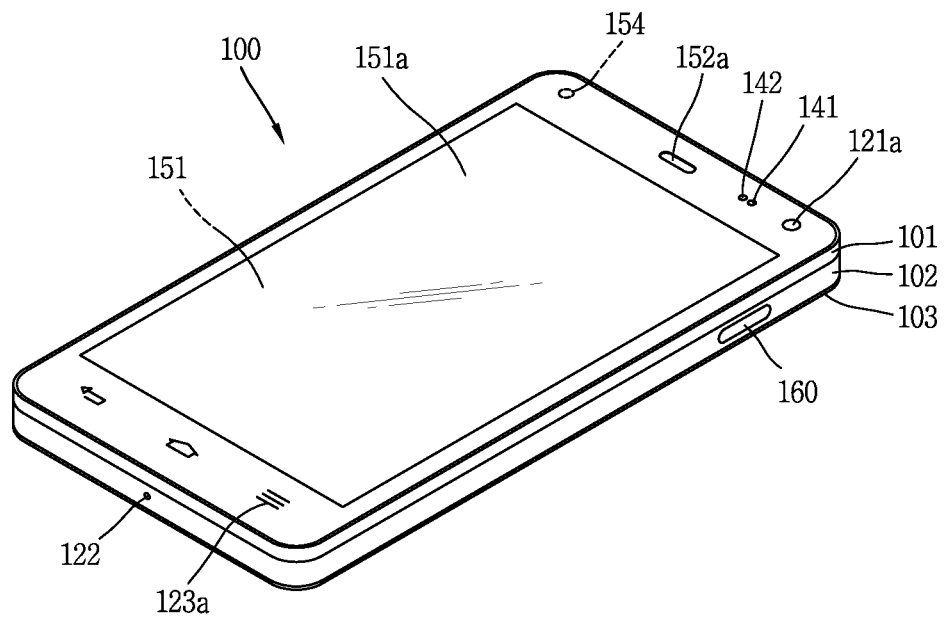
FIGS. 1B and 1C are conceptual views of one example of the mobile terminal, viewed from different directions.
Figure 1C:
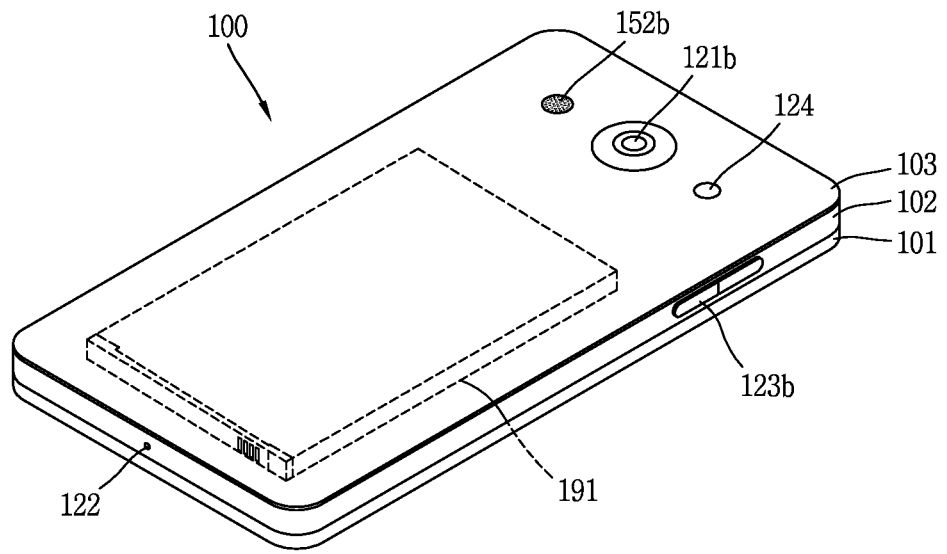

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
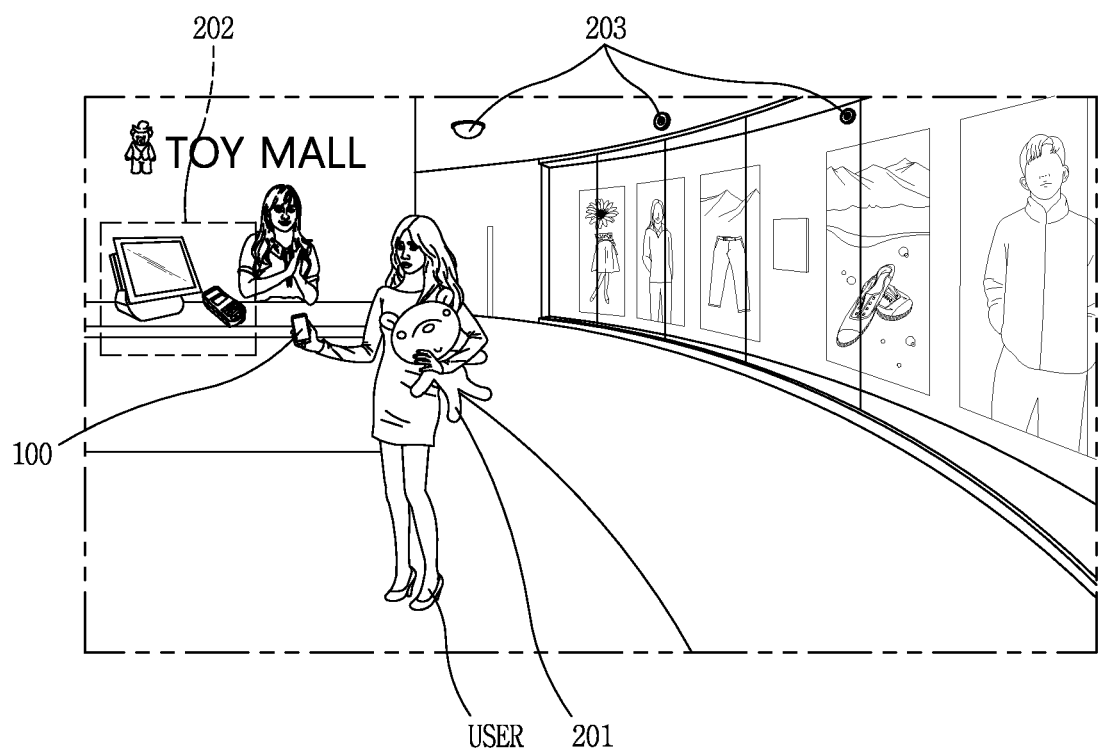
FIG. 2 is a conceptual view illustrating a payment method according to an embodiment of the present disclosure.

FIG. 2 is a conceptual view illustrating a payment method according to an embodiment of the present disclosure.

In a mobile terminal, when payment is performed on goods online or offline, information related to a user may be obtained to generate user evaluation information regarding the goods.

Here, the user-related information may be an image including a user's face, and such an image may be utilized as security information permitting payment. When an image obtained in a situation of payment regarding goods corresponds to previously registered user face information, the controller may permit payment regarding the goods. In the case of online payment, the image may be obtained through the camera 121 provided in the mobile terminal 100.

In the case of offline payment, the image may be obtained by at least one of the camera 121, a point-of-sales (POS) terminal, and at least one of cameras (e.g., a CCTV) installed in a store. An image obtained by a camera provided in other place, not in the mobile terminal 100, may be transmitted to the mobile terminal 100, and the mobile terminal 100 may perform payment on the basis of the received image.

In this manner, when payment is permitted on the basis of the user face, payment indiscreetly performed by an unauthorized third part may be prevented. In this manner, in the mobile terminal of the present disclosure, payment may be permitted on the basis of the user's face as a means for security, and in addition, evaluation information regarding goods may be generated on the basis of the image obtained in the situation of the payment to form meaningful information related to the goods.

Meanwhile, in the mobile terminal according to the present disclosure, the method for authenticating a user's face may not be necessarily used as an authentication method for payment of goods. Thus, apart from payment of goods, information (an image including a user's body such as a user's face or a user's entire body, and the like) related to the user may be obtained in a situation of purchasing goods or in a situation of shopping goods is obtained and the obtained information may be utilized as evaluation information regarding goods.

That is, in the present invention, when a "payment event" for purchasing goods occurs, although information related to the user is not utilized to permit payment, user-related information may be collected and evaluation information regarding goods may be generated by associating the user-related information and the information of the goods.

Thus, hereinafter, a description of "payment is permitted as user's face is authenticated" when payment is made will be omitted.

Also, a method of payment described in the present disclosure is not limited in type.

That is, in the mobile terminal according to the present disclosure, a payment event may occur online or offline.

First, a payment event online may occur in a shopping-related Web page or an application screen information. Such a payment event may occur on the basis of a user's payment request.

When the payment event occurs online, the controller 180 may perform payment through an application appropriate for performing payment, among applications installed in the mobile terminal.

When the online payment event occurs, the controller 180 may activate the camera 121 provided in the mobile terminal to obtain an image. In this case, the image may be captured to include a user's face. In a case in which an object corresponding to a face is not included in the image received through the camera, the controller 180 may output guide information guiding to capture a face.

Also, in the case of offline payment, a payment event may occur when a request for performing payment through a payment module provided in the mobile terminal 100 (mobile payment module) is received from the user.

In another example, in the case of the offline payment, a payment event may occur when a payment request signal is received by the mobile terminal 100 from a POS terminal.

In another example, in the case of offline payment, a payment event may occur when information collected through at least one of the camera and the microphone provided in the mobile terminal 100 corresponds to a payment situation.

For example, in a case in which the mobile terminal 100 is positioned in an offline store (or shop), the controller 180 may activate the microphone at a preset time interval, and when voice information related to purchase is received, the controller 180 may determine that a payment event has occurred.

In another example, in a case in which the mobile terminal 100 is positioned in an offline shop, the controller 180 may activate the camera at a preset time interval, and when voice information related to purchase is received, the controller 180 may determine that a payment event has occurred.

The payment event offline may also occur although the mobile terminal 100 does not have the payment function.

Meanwhile, when a payment event occur offline, the mobile terminal 100 may receive an image, and such an image may be obtained by at least one of the camera 121 provided in the mobile terminal, a POS terminal, and at least one camera (e.g., a CCTV) installed in a store. An image obtained by a camera provided in other place, not in the mobile terminal 100, may be transmitted to the mobile terminal 100.

When a payment event occurs online or offline, the mobile terminal according to the present disclosure may obtain an image and generate evaluation information regarding goods to be purchased, by utilizing such an image.

Here, the obtained image refers to an image captured using a user's face and body including the user's face as a subject, and an image not including such a subject is not utilized as meaningful data in generating evaluation information regarding goods.

In addition, in the mobile terminal according to the present disclosure, an image is not necessarily obtained only when a payment event occurs, and an image obtained in advance before a payment event occurs may also be utilized when the payment event occurs.

Also, in the mobile terminal according to the present disclosure, generating of evaluation information regarding goods is not necessarily limited to a case in which goods are purchased, but when information related to a user's evaluation regarding goods is collected, evaluation information regarding goods may be generated, regardless of purchase.

Hereinafter, for the purposes of description, a case in which payment is made offline will be described as an example, but the following descriptions may also be applied to an online situation in the same or similar manner.

First, as illustrated in FIG. 2, a store purchasing goods may include at least one camera 203. Such cameras 203 may be disposed in different positions of the store. Also, although not shown, a camera may also be provided in a POS camera 202.

Also, in the store, at least one wireless communication module may be disposed, and such a wireless communication module may perform wireless communication with the mobile terminal 100.

When a user enters or leaves the store, the wireless communication module disposed in the store may sense the user entering or leaving the store.

The wireless communication module disposed in the store may be a short-range wireless communication module, and may be a module performing communication according to any one of various communication schemes such as an NFC communication module, a beacon, ZigBee, and the like.

A central controller of the store may control the wireless communication module installed in the store and the cameras, a microphone, and the like, disposed in the store to collect information regarding goods the user is shopping in the store, goods purchased by the user, or an evaluation on certain goods.

When the user enters the store, the central controller of the store pairs with the mobile terminal 100 of the user to store identification information of the mobile terminal 100, information of goods interested by the user, and collected information (image information collected through the camera, voice information collected through the microphone, and the like) regarding the user who carries along the corresponding mobile terminal 100 in an associated manner, and transmit collected information to the corresponding user later as necessary.

Here, goods interested by the user may include goods purchased by the user, goods beside which the user has stayed for a preset period of time or longer, and goods evaluated by the user.

Meanwhile, the collected information may further include information of goods interested by the user.

The goods interested by the user may be monitored from devices disposed in the store, such as the wireless communication module, the POS terminal, and the like, disposed in the store.

Also, the central controller of the store may process the collected information by itself to generate evaluation information regarding the user and transmit the same to the mobile terminal 100 of the user.

Meanwhile, as discussed above, payment on the goods may be made between an application provided in the mobile terminal 100 and the POS terminal 202, and a request for payment may be made by the mobile terminal 100. Also, conversely, a request for payment may be made by the POS terminal.

When payment is made between the mobile terminal 100 and the POS terminal 202, the collected information (image information collected through the camera, voice information collected through the microphone, and the like) related to the user collected in the store may be transmitted from the POS terminal 202 to the mobile terminal 100 at the time of payment.

Also, in a case in which payment on goods is not made, when it is sensed that the user who carries along the mobile terminal 100 leaves the store, collected information may be transmitted from the central controller of the store to the mobile terminal 100. This situation may be established as the mobile terminal 100 and the wireless communication module provided in the store communicate with each other.

In addition, payment on goods may not necessarily made between the mobile terminal 100 and the POS terminal, and in this case, the mobile terminal 100 may perform a function of generating evaluation information regarding goods by using the collected information (image information collected through the camera, voice information collected through the microphone, and the like) related to the user collected independently from payment in the store.

Meanwhile, for example, when payment is made between the POS terminal and the mobile terminal 100, the mobile terminal 100 may perform user authentication on the basis of the collected information from the store, and when authentication is successfully completed, the mobile terminal 100 may approve the payment.

The collected information may be obtained through the camera provided in the POS terminal and the camera provided in the store as mentioned above.

Hereinafter, a method for performing authentication regarding payment by utilizing collected information and generating evaluation information using the collected information will be described in detail with reference to the accompanying drawings. FIG. 3 is a flow chart illustrating a payment method according to an embodiment of the present disclosure.

First, as illustrated in FIG. 3, the mobile terminal 100 transmits payment request to the POS terminal 202 (S301). The payment request may be directly transmitted from the mobile terminal 100 to the POS terminal or may be transmitted from the mobile terminal 100 to the POS terminal 202 through at least one server (for example, a cloud server, a server of a card company, and the like).

When the payment request is received, the POS terminal 202 may collect information regarding the mobile terminal

100. Here, the collected information may be a face image as illustrated. The POS terminal 200 collects the user's face image from the camera provided in the POS terminal 202 or at least one camera installed in the store (S302). In a case in which the user's face image is collected through the camera provided in the POS terminal 202, the POS terminal 202 may activate the camera provided therein in response to the received payment request.

When collecting the user's face image is completed in the POS terminal 202, the POS terminal 202 transmits the collected information (or the face image) to the mobile terminal 100.

The collected information may be directly transmitted from the POS terminal 202 to the mobile terminal 100 or may be transmitted from the POS terminal 202 to the mobile terminal 100 through at least one server (for example, a cloud server, a server of a card company, and the like).

The information transmitted from the POS terminal 202 does not necessarily include only a face image but may include the user's voice information collected from the store or information of goods interested by the user.

Meanwhile, the mobile terminal 100 analyzes a face image 304 included in the collected information from the POS terminal 202 and performs an authentication process of determining whether the face image matches a previously registered user.

A face image of an authorized user may be registered in advance in the mobile terminal 100, and face images of left and right sides may be present in the mobile terminal 100. The controller 180 performs authentication on the authorized user by comparing the received face image with the face image of the previously registered authorized user on the basis of the received collected information. Also, the controller 180 approves or rejects payment on the goods on the basis of the comparison result (S305). The controller 180 transmits payment approval or rejection information to the POS terminal 202 (S306), and the POS terminal 202 performs a payment process according to the received information (S307). When the authorized user is authenticated through the received collected information, the controller 180 may approve payment, and when authentication fails, the controller 180 may reject payment. Such payment approval or payment rejection is generated as specific data and transmitted to the POS terminal 202.

Meanwhile, when payment is completed (the corresponding process may be performed although payment is not completed), the controller 180 performs a process of generating evaluation information regarding goods using the received collected information (information including a face image, in particular) (S308).

Also, in the POS terminal, a process of deleting the collected information (in particular, the face image) is performed for privacy of the user of the mobile terminal 100 (S309).

Meanwhile, in step S308, the controller 180 may generate evaluation information regarding goods, and the evaluation information regarding goods may also be generated even not in a case in which an authorized user is authenticated. An embodiment of generating evaluation information may be applied to all of i) a case in which payment is made between the mobile terminal and the POS terminal, ii) a case in which payment is not made between the mobile terminal and the POS terminal, iii) a case in which payment on goods is made, and iv) a case in which payment on goods is not made.

That is, when information regarding goods and collected information related to a user regarding the goods are present, the controller may generate evaluation information regarding goods.

Here, the evaluation information regarding goods may be generated on the basis of at least one of image information collected from the POS terminal, image information collected through the camera installed in the store, and voice information collected through the microphone installed in the POS terminal, the mobile terminal, or the microphone installed in the store. That is, the present disclosure aims at extracting user's explicit (candid or honest) feelings on goods on the basis of facial expressions, behaviors, or words (or speech) the user unconsciously makes in purchasing goods or doing shopping.

Figure 4A:
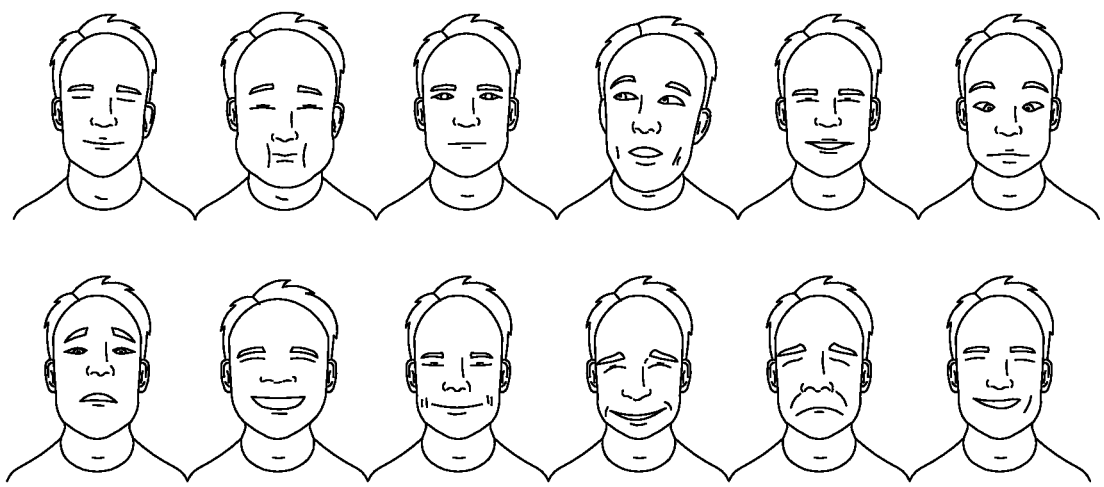
FIGS. 4A and 4B are conceptual views illustrating a method for analyzing user's feeling about goods.
Figure 4B:
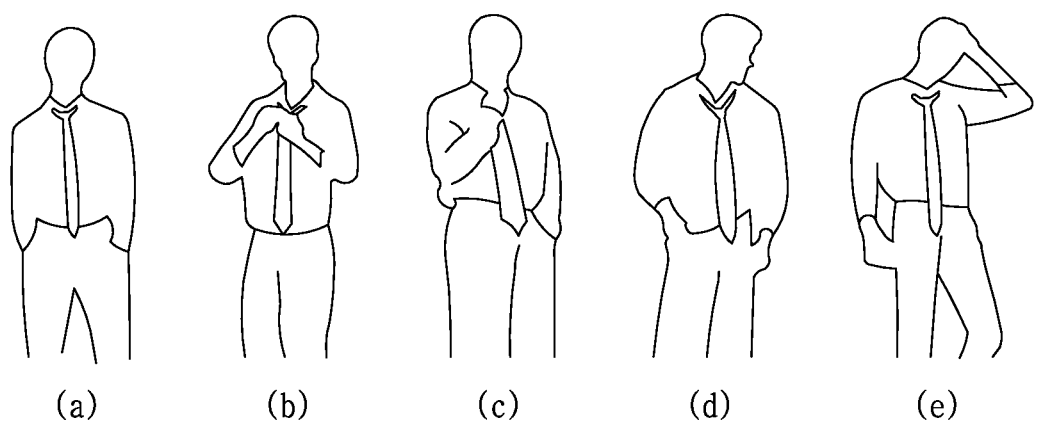
Figure 5:
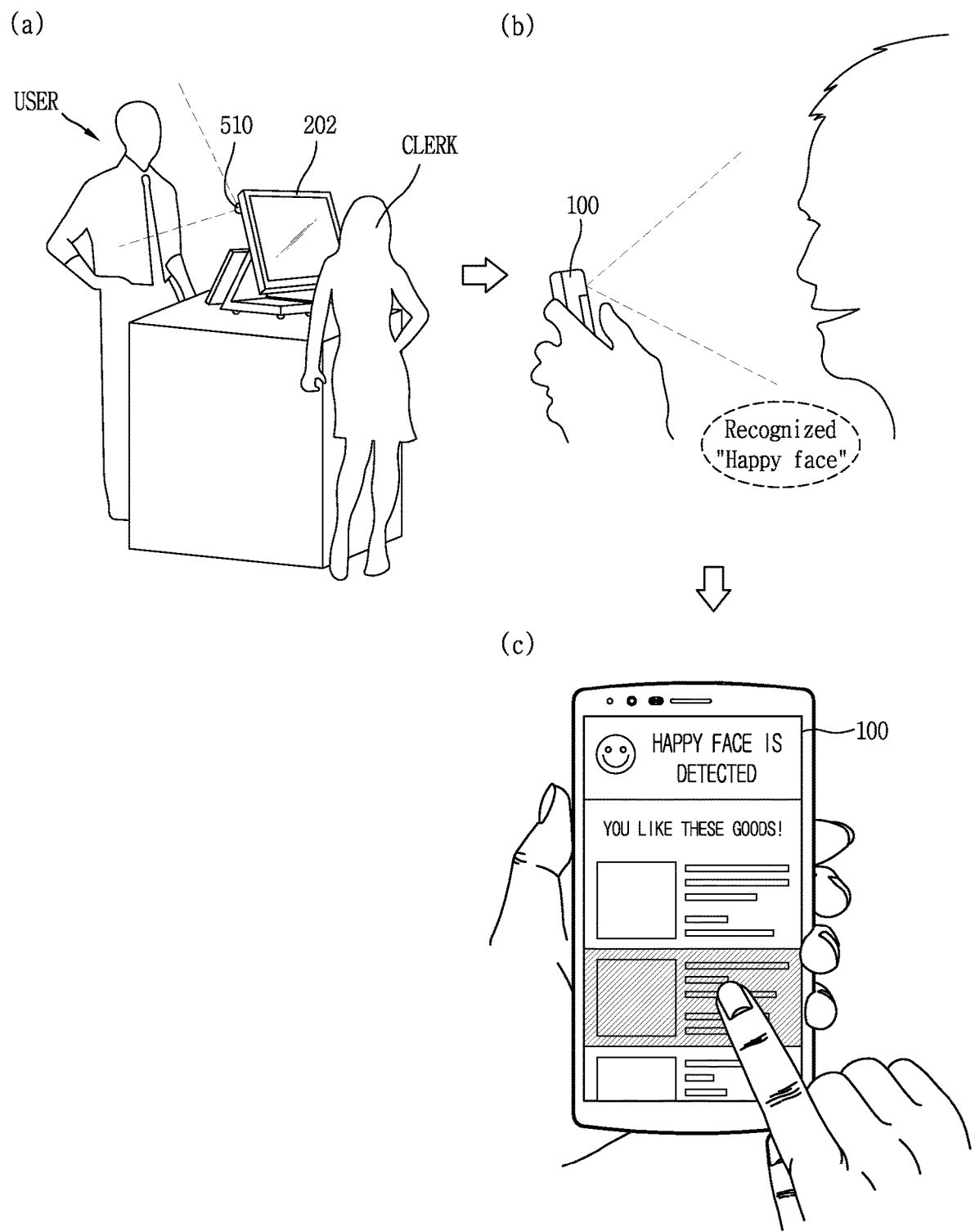

Hereinafter, a method for generating evaluation information regarding goods will be described in detail with reference to the accompanying drawings. FIGS. 4A and 4B are conceptual views illustrating a method for analyzing user's feeling about goods, and FIGS. 5, 6A, 6B, 6C, and 6D are conceptual views illustrating a method for generating evaluation information in a mobile terminal according to an embodiment of the present disclosure.

As discussed above, in the mobile terminal according to the present disclosure, evaluation information regarding goods may be generated on the basis of facial expressions, gestures, and voices that the user may make while doing shopping or purchasing goods.

The controller 180 may generate evaluation information of the user regarding goods using the information collected by the mobile terminal itself or using information collected through a camera or a microphone provided in an area where the mobile terminal is positioned.

As illustrated in FIG. 4, the user may express his feelings on goods through his facial expression when purchasing goods or doing shopping. Also, as illustrated in FIG. 4B, the user may express user's feelings on goods through his gesture or behavior when purchasing the goods or doing shopping. Also, although not shown, the user may express his feelings on goods through speech at the time of purchasing goods or doing shopping.

Various types of information by which the user's feelings may be figured out may be collected through various methods as discussed above, and the controller 180 may generate evaluation information regarding goods by analyzing user's feelings about the goods by using the collected information.

Although not shown, the evaluation information may be information obtained by matching information regarding goods and user's feeling information. As for the feeling information, user's facial expressions, gestures, voices, and the like, may be present as log information such that the log information may be searched again through the user's facial expressions, gestures, and voices. For example, as for the evaluation information, at least one of evaluation information of the user regarding specific goods and user's facial expression, gesture, and voice at the time may be present as a group.

The controller 180 may analyze the collected information by using at least one of a face analysis algorithm, a behavior analysis algorithm, and a language analysis algorithm based on psychology. For example, as illustrated in (a) of FIG. 5, the user's facial image may be obtained through the POS terminal at the time of purchasing goods, and the controller 180 generates user's evaluation information regarding the goods using the facial image.

For example, in a case in which the user makes a smiling expression at the time of purchasing goods, the controller 180 may generate evaluation information that "the user likes the purchased goods" on the basis of various algorithms. Such evaluation information may be provided to the user or to a third party later.

Such evaluation information may be stored in the memory provided in the mobile terminal 100. Also, such evaluation information may be stored in a cloud server or an external repository. Also, such evaluation information may be shared by a third party on the basis of a user selection. Also, a person who will share the evaluation information may be determined on the basis of a user selection.

Meanwhile, after the evaluation information is generated, when a facial expression corresponding to a facial expression corresponding to a collected facial image of a person who has purchased the goods is received through a search function regarding the goods as illustrated in (b) of FIG. 5B, the controller 180 may provide information regarding the purchased goods to the user as illustrated in (c) of FIG. 5B.

Thus, as illustrated in FIG. 6A, information collected while the user is doing shopping, for example, user's evaluation regarding goods such as user's speech indicating that he likes the goods, a gesture of nodding his head (please refer to (a) of FIG. 6A), or user's speech evaluating a prices of goods (please refer to (b) and (c) of FIG. 6A), may be collected through an input unit (camera, microphone, etc.) provided in the mobile terminal or the store and utilized as evaluation information regarding goods. In another example, as illustrated in (a) of FIG. 6D, when information regarding a user's smiling expression at the time of purchasing goods is collected as illustrated in (a) of FIG. 6B, the controller 180 generates evaluation information such that the goods may be searched as goods that the user likes from the terminal 100.

Also, as illustrated in (b) of FIG. 6B, when information regarding a user's grimace at the time of purchasing goods is collected, the controller 180 generates evaluation information such that the goods are searched as goods that the user does not like from the terminal 100. Also, as illustrated in FIG. 6B, the controller 180 may include information regarding whether the goods was finally purchased or not in the evaluation information.

Figure 6C:
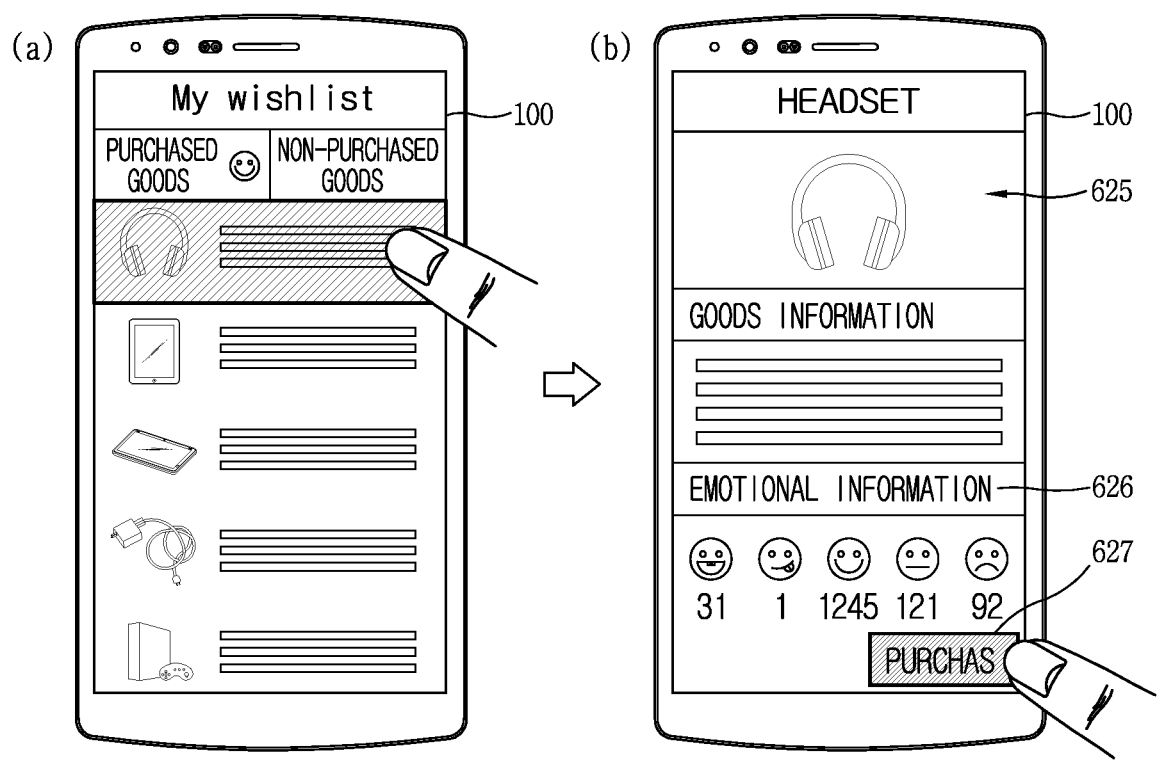

Also, the evaluation information may be utilized as a purpose for guiding purchase of goods later. For example, as illustrated in FIG. 6C, when any one of goods for which evaluation information was generated is selected, the controller 180 may output evaluation information 625 of the corresponding goods. The evaluation information 625 may include general information and emotional information 626 regarding the goods as illustrated. The emotional information 626 may further include information evaluated by a third party, as well as information evaluated by the user. In addition, the controller 180 may further output a purchase function icon 627 such that the corresponding goods may be purchased. When the purchase function icon 627 is selected, the controller 180 may output a Web page or execute an application related to purchase of the goods.

Figure 6D:
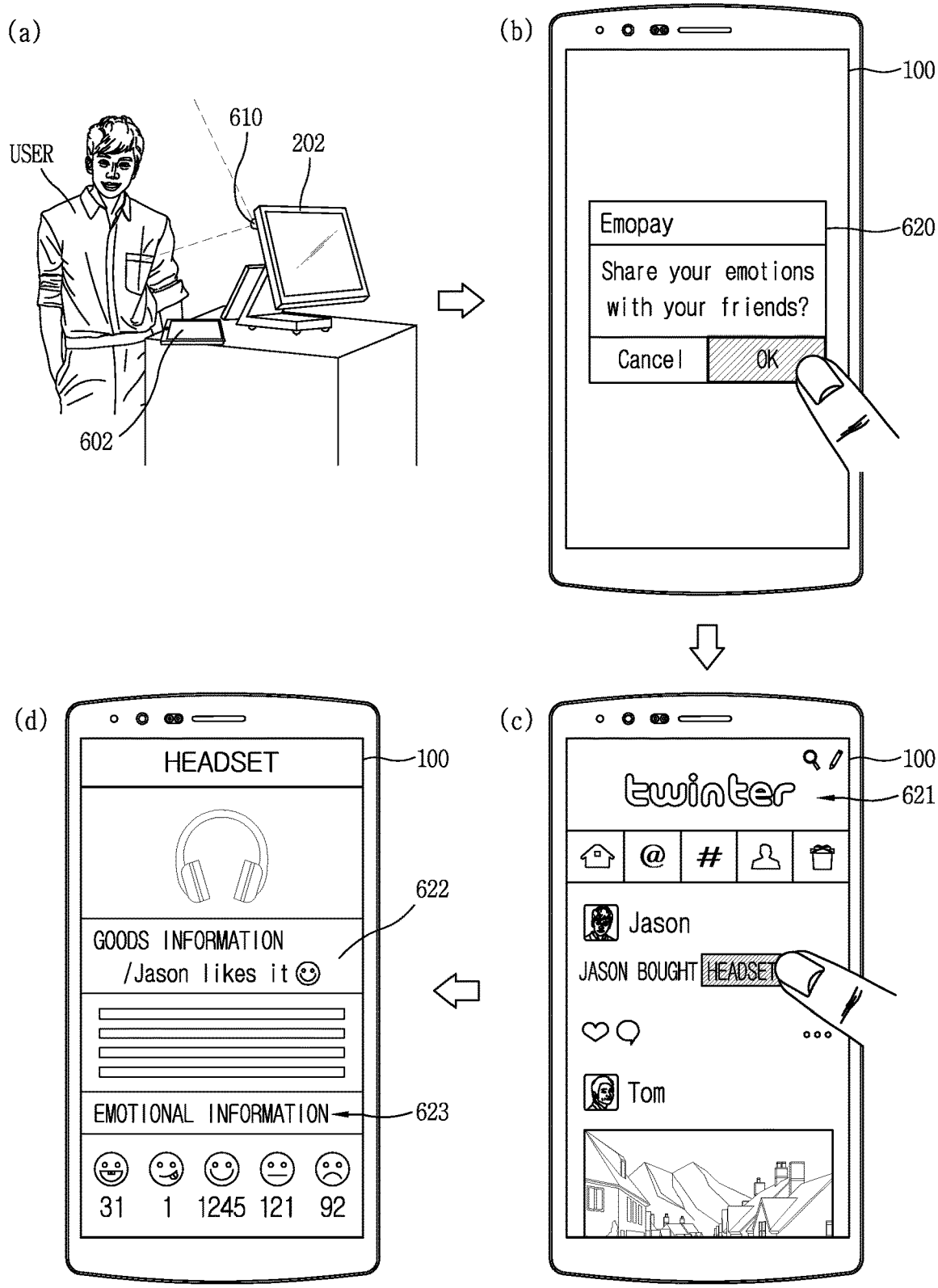

Meanwhile, when evaluation information regarding goods is generated as illustrated in (a) of FIG. 6D, the controller 180 may transmit the evaluation information to a third party on the basis of a user selection as illustrated in (b) of FIG. 6D.

As illustrated in (c) of FIG. 6D, such evaluation information may be uploaded to a social network service (SNS) site of the user or may be transmitted to a third party selected by the user. As the evaluation information is provided to the third party, user's evaluation regarding the goods may be shared or purchasing the goods may be induced as illustrated in (d) of FIG. 6D.

In the mobile terminal and the control method thereof according to the present disclosure as described above, since a user's face is utilized as an authentication means, when a face of an authorized user is authenticated at the time of payment, payment may be made. Thus, payment made by a third party may be prevented. Also, the mobile terminal according to the present disclosure may generate evaluation information regarding goods by analyzing user's feelings on the goods by utilizing the user's facial image used at the time of payment. In this case, even though the user does not separately create a postscript regarding goods, the evaluation information may be automatically generated, and the evaluation information may be made into database so as to be utilized by the user later or may be shared by other people.

Hereinafter, a method for utilizing generated evaluation information will be described in detail with reference to the accompanying drawings. FIGS. 7A, 7B, 7C, 7D, and 7E are conceptual views illustrating a method for searching for goods in a mobile terminal according to an embodiment of the present disclosure.

In the mobile terminal according to the present disclosure, at least one of the user's expression, gesture, and voice may be utilized when generated evaluation information is searched. For example, as illustrated in (a) of FIG. 7A, data for searching for goods may be input in various manners. Search conditions may be input through at least one of image input, text input, and feeling selection. For example, when image input is selected as illustrated in (a) of FIG. 7A, the controller 180 may activate the camera and control the camera to obtain the user's facial image through the activated camera as illustrated in (b) of FIG. 7A. Also, the controller 180 may search for goods corresponding to evaluation information corresponding to the user's facial expression corresponding to the facial image among evaluation information, and output search result on the touch screen as illustrated in (c) of FIG. 7A.

Here, evaluation information used to search for goods information may be evaluation information generated by the mobile terminal itself or may be evaluation information included in a preset database. In this case, the evaluation information may include evaluation information by a third party, as well as evaluation information by the user.

Such evaluation information may be classified into a plurality of grades on the basis of at leas tone of a facial expression, behavior, and voice of a person, so as to be present.

The controller 180 may extract a grade corresponding to a facial image obtained through the camera on the basis of a preset face analysis algorithm, and search for goods having evaluation information corresponding to the extracted grade.

Meanwhile, when a feeling regarding the obtained facial image is analyzed, the controller 180 may output an analysis result and the user may finally confirm as to whether an expression according to the corresponding facial image corresponds to the feeling based on the analysis result. The controller 180 may output other feeling items corresponding to or similar to the analyzed feelings, and match a feeling corresponding to an item selected by the user to a facial expression based on the obtained facial image.

Also, in the present disclosure, when an image obtained as the camera is activated, user's voice information may also be received together. The controller 180 may activate the microphone together with the camera in response to a goods search request through image input. Also, the controller 180 may specify a category of search target goods on the basis of a voice received through the microphone. The controller 180 may search for goods having evaluation information corresponding to a grade corresponding to the user's facial expression included in the image received through the camera, among goods corresponding to the specified category.

Thus, although the user does not directly input a search word, the user may search for desired goods by simply capturing an image and inputting a voice.

Figure 7A:
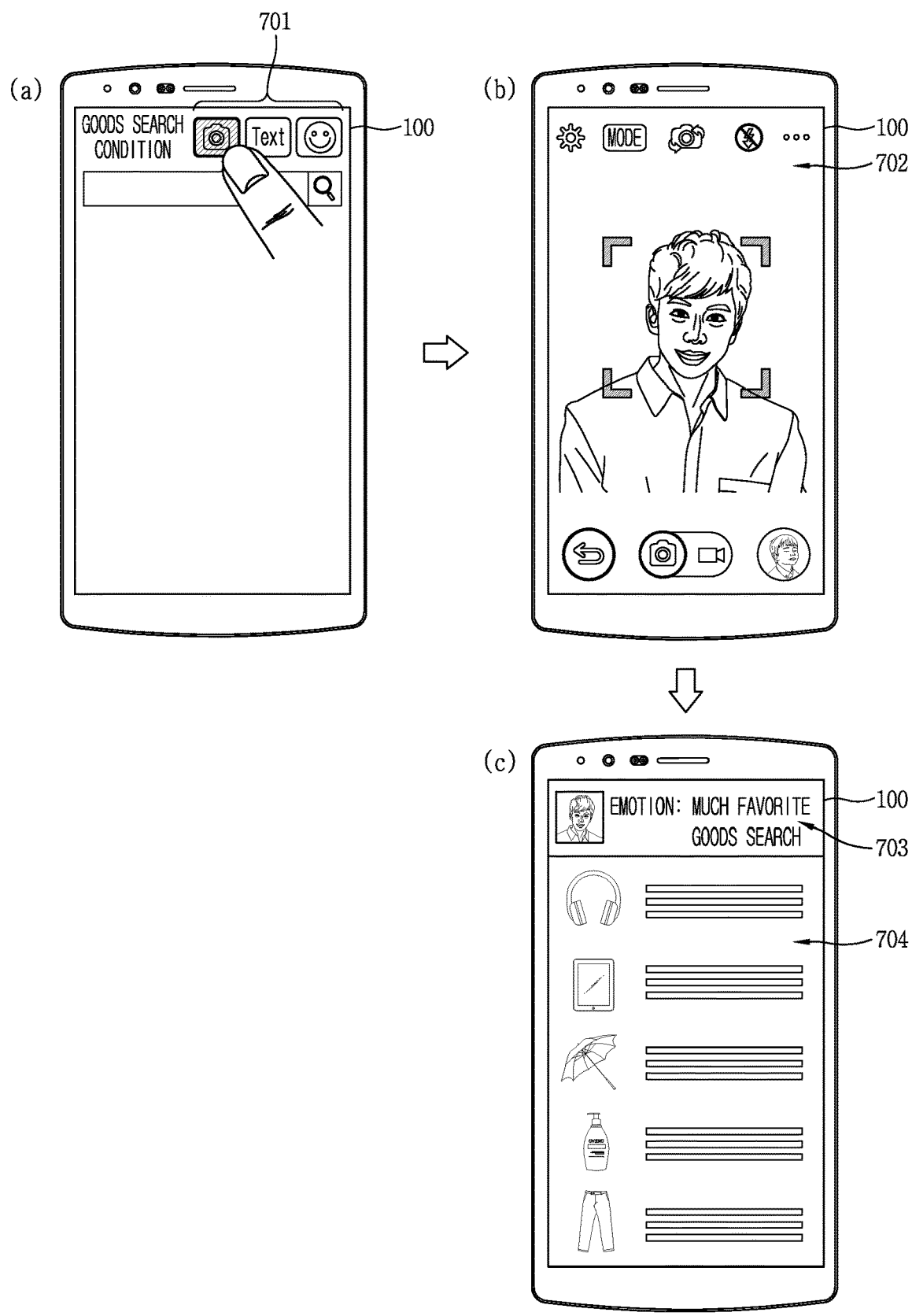
FIGS. 7A, 7B, 7C, 7D, and 7E are conceptual views illustrating a method for searching for goods in a mobile terminal according to an embodiment of the present disclosure.
Figure 7B:
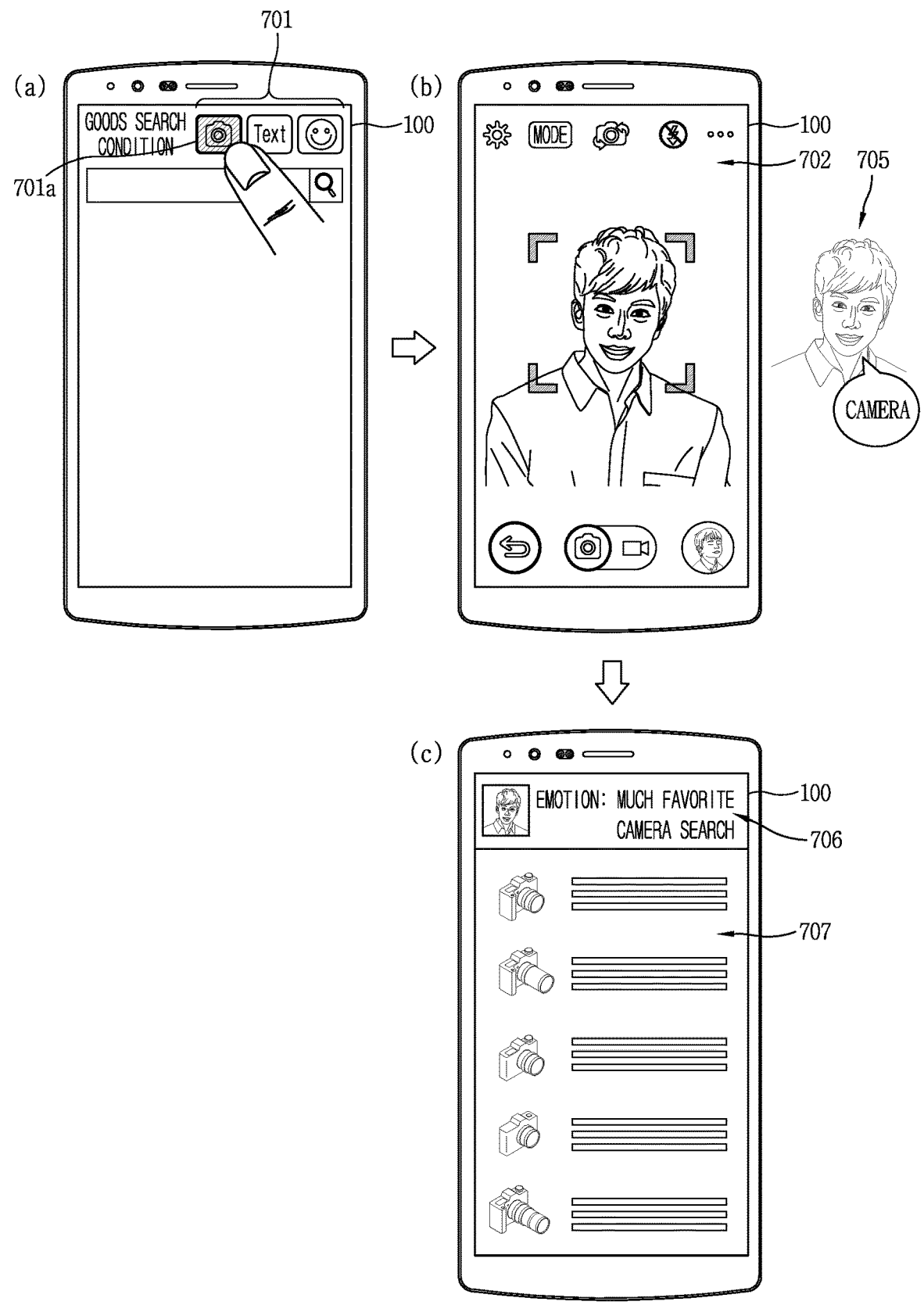
Figure 7C:
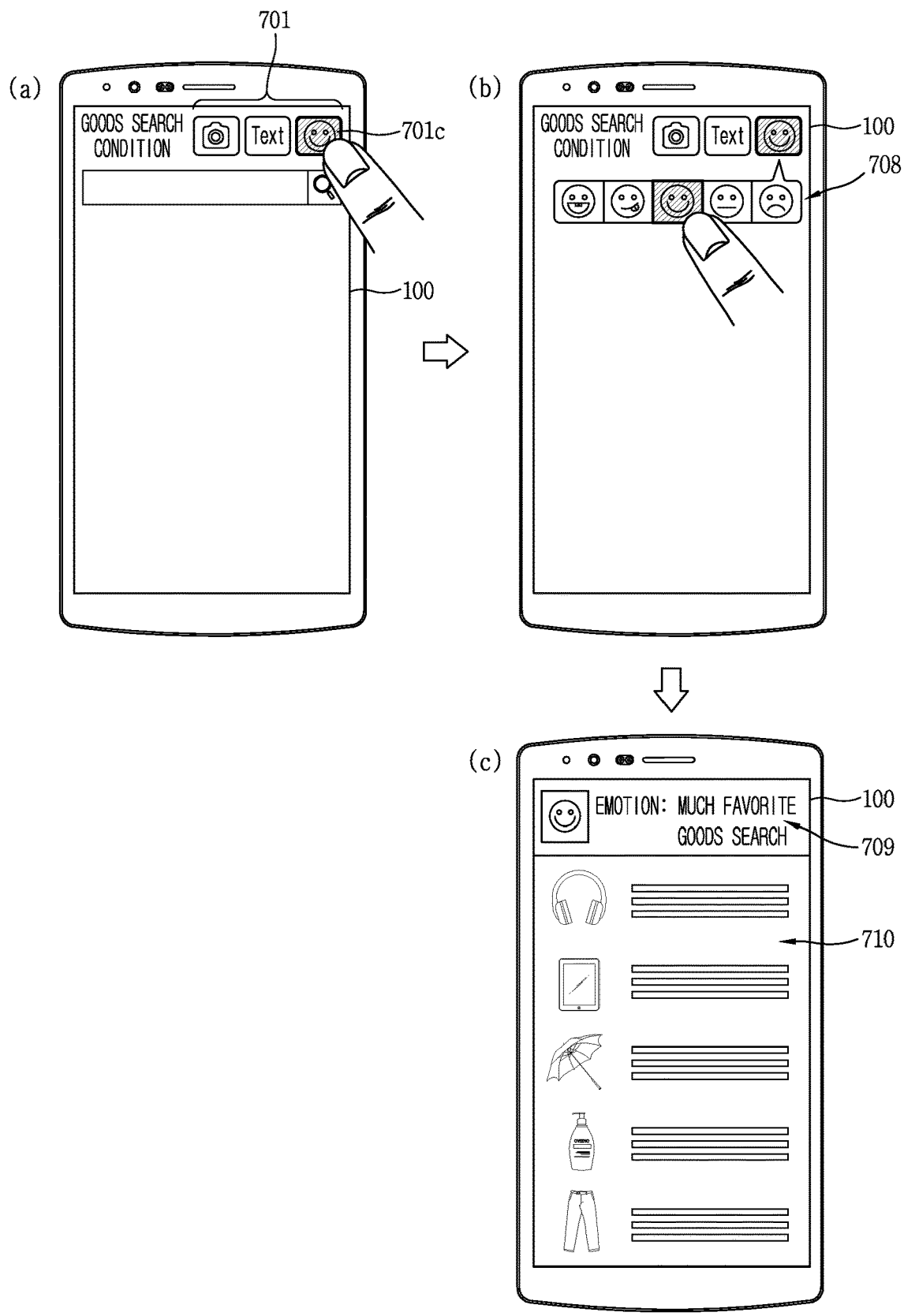

In another example, as illustrated in (a) and (b) of FIG. 7C, in the mobile terminal according to the present disclosure, goods search conditions may be set as the user selects feelings. As illustrated, the controller 180 may output items 708 representing different feelings, and search for goods having evaluation information corresponding to the feeling information corresponding to a selected item, and output a search result as illustrated in (c) of FIG. 7C.

Here, the evaluation information used to search for goods information may be evaluation information generated by the mobile terminal itself or may be evaluation information included in a preset database. In this case, the evaluation information may include evaluation information by a third party, as well as evaluation information by the user.

Here, images of the items 708 may include actual user's facial images. In addition, when the items are selected, the controller 180 may receive goods category information through the microphone. Also, the controller 180 may search for goods corresponding to evaluation information having a feeling corresponding to the selected item in the input goods category.

Meanwhile, as discussed above, in a case in which the camera is activated and evaluation information corresponding to a facial expression, a behavior, and the like, corresponding to an image through the camera is searched, the controller 180 may analyze a user's feeling in accordance with an input image, and search for evaluation information corresponding to the analyzed feeling. In this case, in a case in which a result of analyzing the input image is different from a feeling actually intended by the user, there is a possibility of searching for erroneous goods information. For example, the controller 180 may recognize a facial expression made by the user intending to search for "goods that the user likes", as an intention to search for "goods that the user much likes". In this case, the analyzed feel is required to be corrected.

Figure 7D:
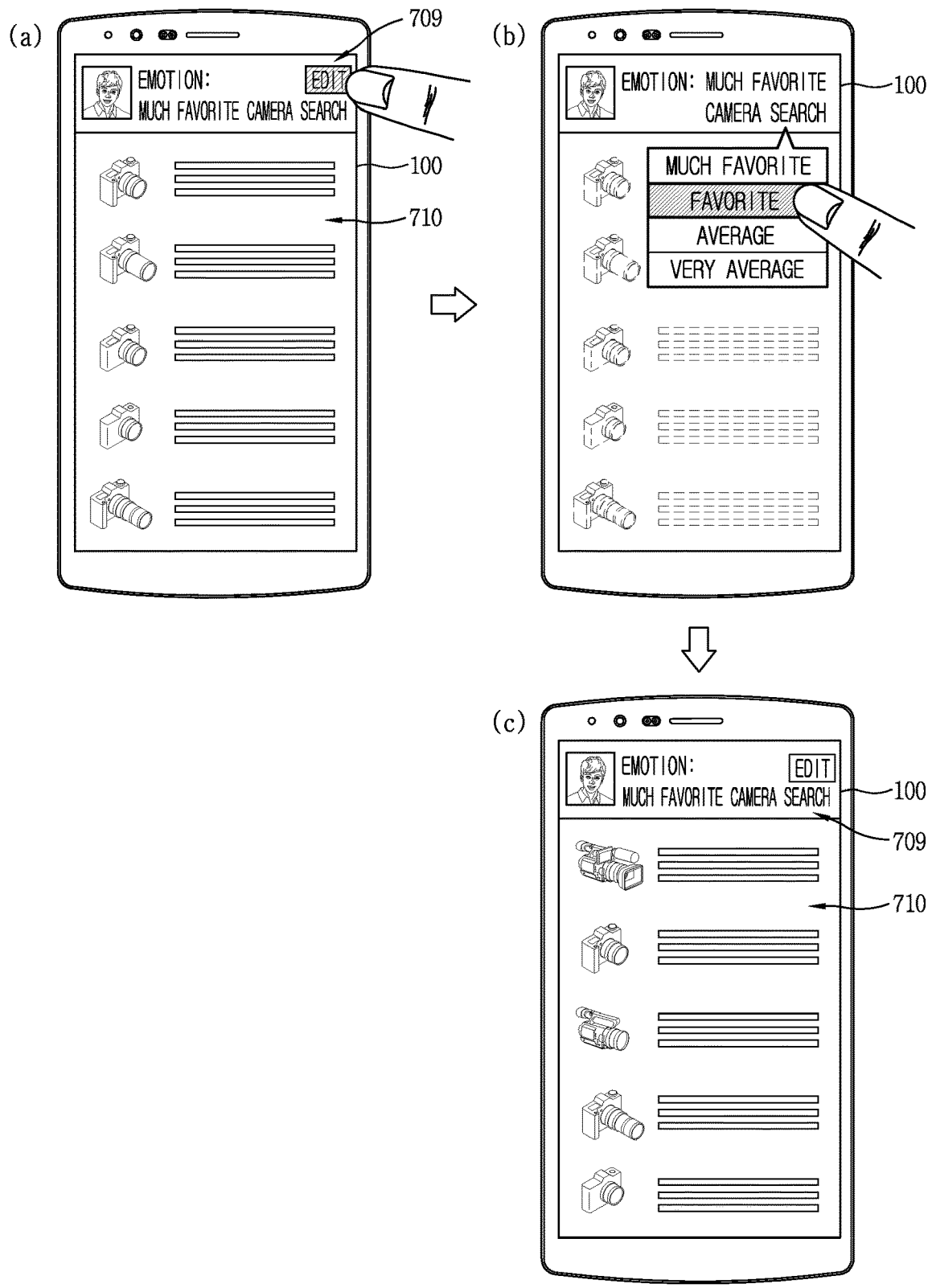

For example, a correction function regarding an analyzed feeling may be selected (for example, it is possible to correct an analysis result through a correction icon 709) as illustrated in (a) of FIG. 7D, and the controller 180 may output correction target items as illustrated in (b) of FIG. 7D. Also, when any one of items is selected, for example, when an item "I like it" is selected, the controller 180 may correct the analyzed feeling, search for goods having evaluation information corresponding to a feeling corresponding to the selected item, and output the search result again as illustrated in (c) of FIG. 7D.

Also, the controller 180 may match the user's facial expression information corresponding to the image input through the camera and the corrected feeling information and store the same, such that when the user's facial expression is input again later, the controller 180 may derive the analysis result by the corrected feeling information.

Figure 7E:
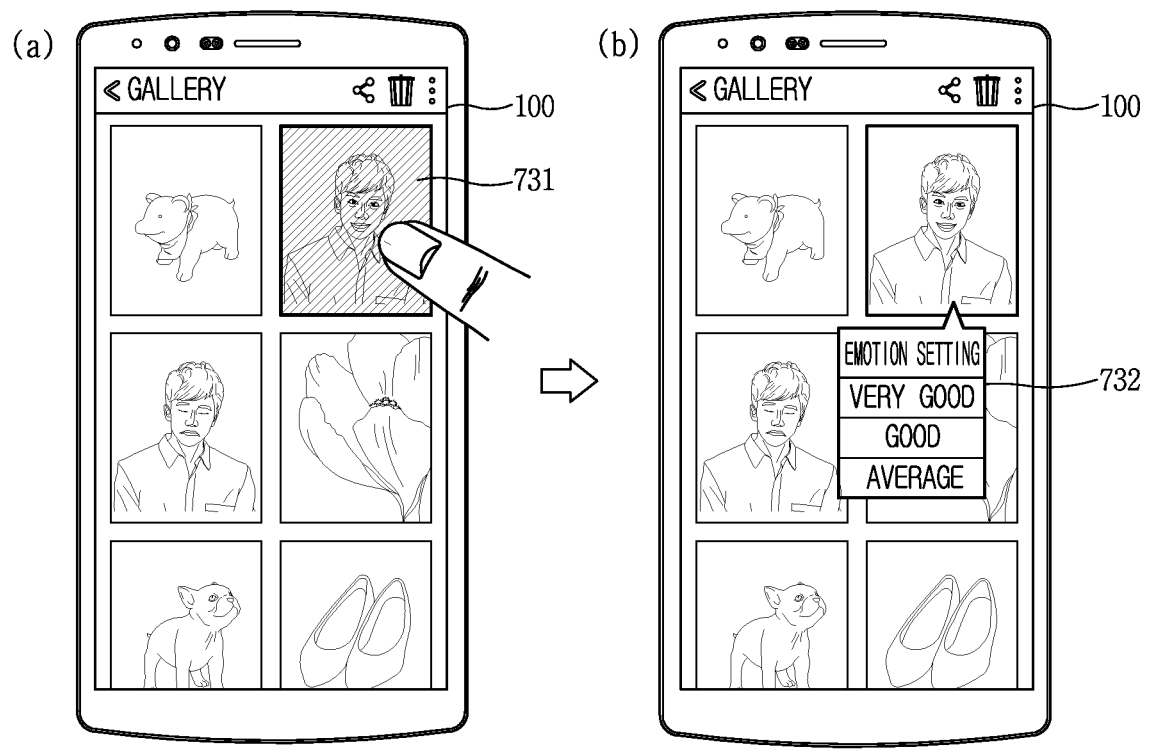

In addition, in the mobile terminal according to the present disclosure, as illustrated in (a) of FIG. 7E, user's feeling information may be collected by utilizing photographs stored in the mobile terminal. As illustrated, the controller 180 may provide feeling selection items 732 regarding user's facial images. Also, the controller 180 may match a feeling corresponding to a selected item and a facial expression corresponding to a user's facial image, and store the same. Such matching information may be utilized for analyzing user's feelings later.

In addition to the method for providing a feeling selection function regarding the user's facial image, when a user's facial image is recognized, the controller 180 may recommend a feeling selection function to the user.

Meanwhile, regarding goods requested to be evaluated by a third party, the mobile terminal according to the present disclosure may transmit user's feeling information. FIGS. 8A, 8B, 8C, and 9 are conceptual views illustrating a method for collecting evaluation information regarding goods in a mobile terminal according to an embodiment of the present disclosure.

Figure 8A:
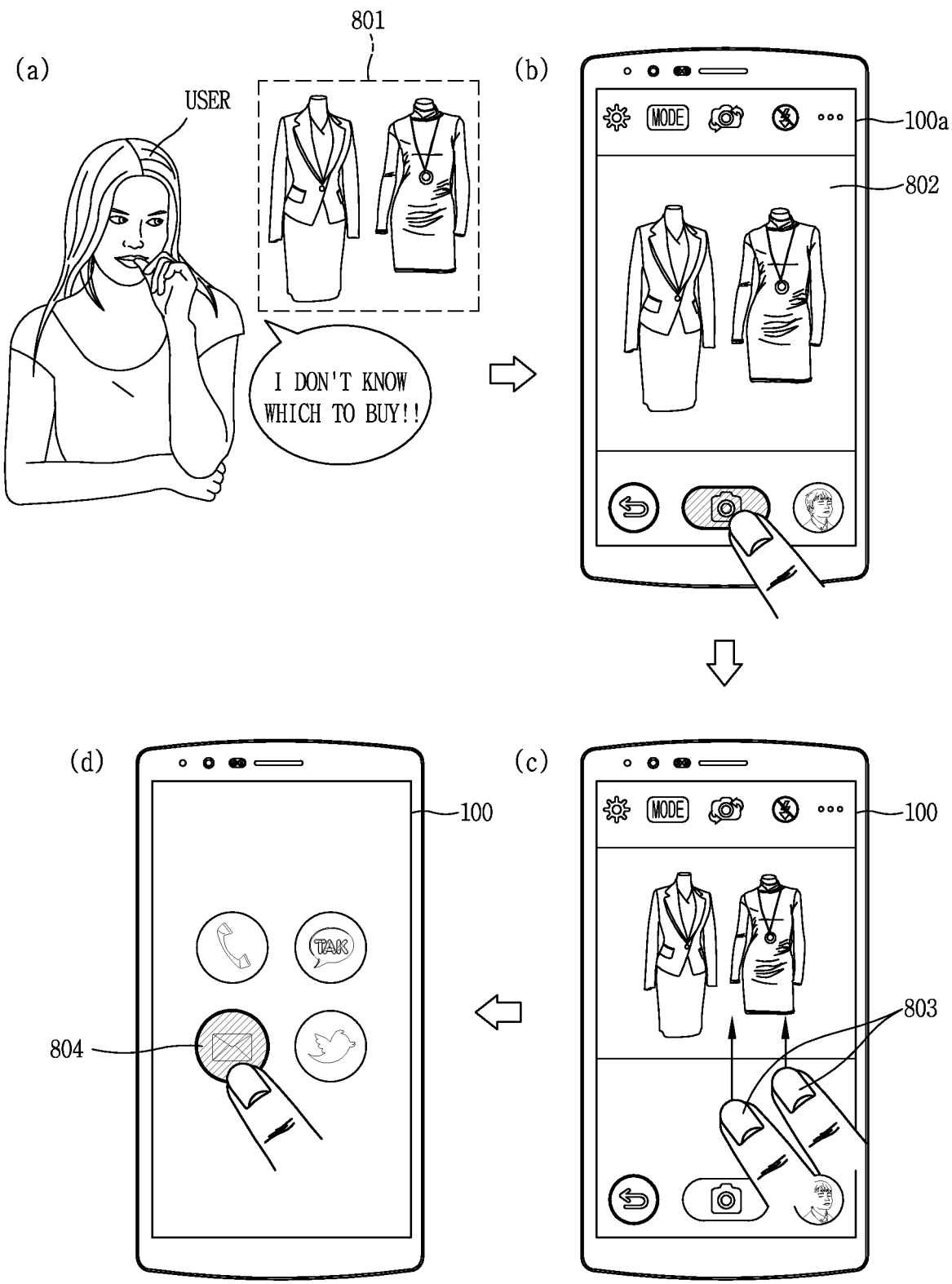
FIGS. 8A, 8B, 8C, and 9 are conceptual views illustrating a method for collecting evaluation information regarding goods in a mobile terminal according to an embodiment of the present disclosure.
Figure 8B:
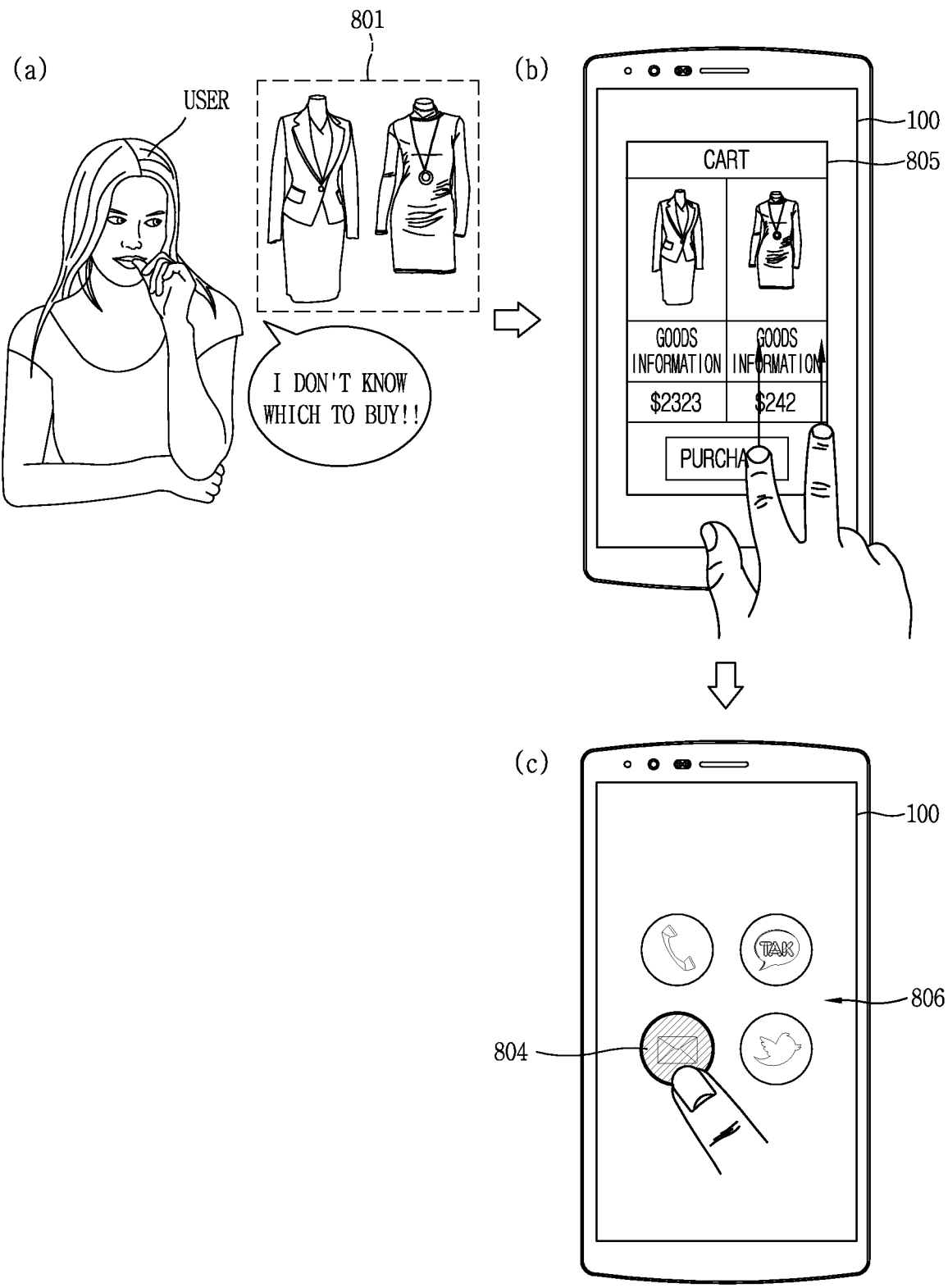
Figure 8C:
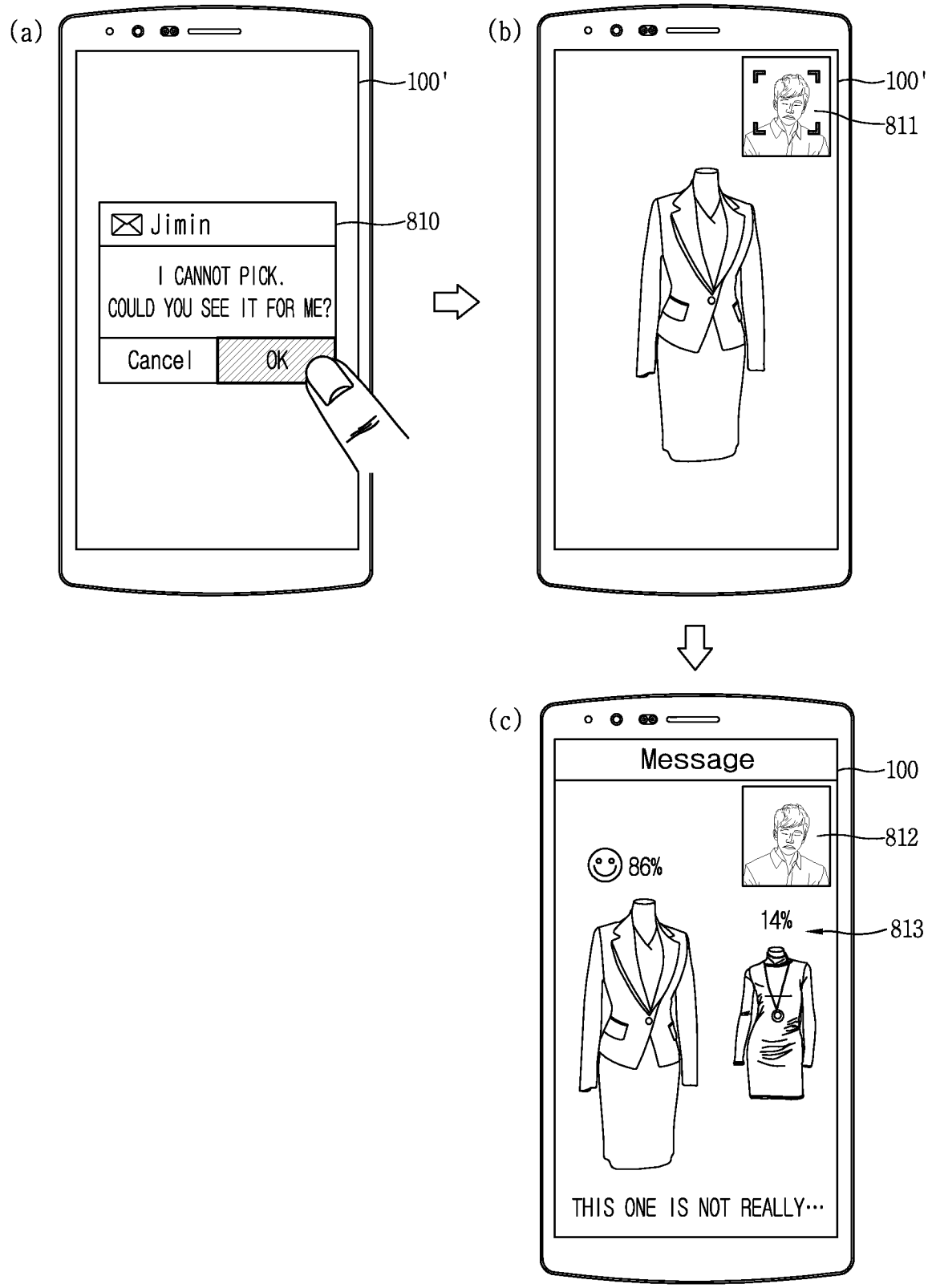

The mobile terminal according to the present disclosure may generate and transmit evaluation information regarding goods requested by a counterpart by utilizing user's facial expression, gesture, and voice. In a case in which a counterpart, who hesitates to purchase goods offline, captures an image of the corresponding goods and transmits the same to the mobile terminal 100 as illustrated in FIG. 8A, or in a case in which a counterpart, who hesitates to purchase goods while doing mobile shopping, transmits information regarding corresponding goods as illustrated in FIG. 8B, the mobile terminal may activate the camera to collect an image of the user and analyze the user's feeling regarding the collected image as illustrated in FIG. 8C. In the mobile shopping, the mobile terminal performing mobile shopping may capture a current screen of the mobile terminal and transmit the captured screen to the counterpart.

Also, as illustrated in (c) of FIG. 8C, the mobile terminal 100 may transmit the analyzed result to the counterpart. When goods information is received through a message, or the like, the controller 180 may activate the camera to obtain an instantaneous facial expression of the user who takes a look at the goods information, thereby obtaining user's honest evaluation information regarding the goods.

Meanwhile, in a case in which a plurality of pieces of goods information are received from a counterpart terminal, the controller 180 may sequentially output the plurality of pieces of goods information, and control the camera to obtain different image information each time goods information is switched, thereby causing evaluation information regarding each goods to be separately generated. Also, the controller 180 may integrate pieces of evaluation information regarding the plurality of pieces of goods information to provide an evaluation rating of the user among a plurality of goods.

When a goods information request message is received, the controller 180 may activate the camera, obtain an image of the user who is viewing goods information, and analyze user's feelings based on the obtained image. Also, the controller 180 may transmit the analysis result to the counterpart terminal again.

Meanwhile, such goods information request message may be uploaded to an SNS site, and when a corresponding posting is selected, the camera of the mobile terminal of the corresponding posting may be activated to obtain a user's facial image and analyze the obtained facial image.

Also, although not shown, the controller 180 may sense at which portion of goods information the user gazes, through a pupil recognition algorithm. Also, in generating evaluation information, the controller 180 may associate information of goods corresponding to the portion at which the user has gazed and a user's feeling. For example, as for goods corresponding to "(one-piece) dress", in a case in which the user has gazed at an upper part of the dress more carefully, relative to a lower part of the dress, the controller 180 may generate evaluation information of the user regarding the "upper part of the dress".

The generated evaluation information may be transmitted in the form of a message to the counterpart terminal.

Meanwhile, a goods information evaluation message received from the counterpart may include a control command for activating the camera. A function of generating evaluation information on the basis of a user's facial expression may also be provided through a specific application. Meanwhile, the mobile terminal according to the present disclosure may also transmit an evaluation information request message requesting evaluation of goods to the counterpart terminal.

Figure 9:
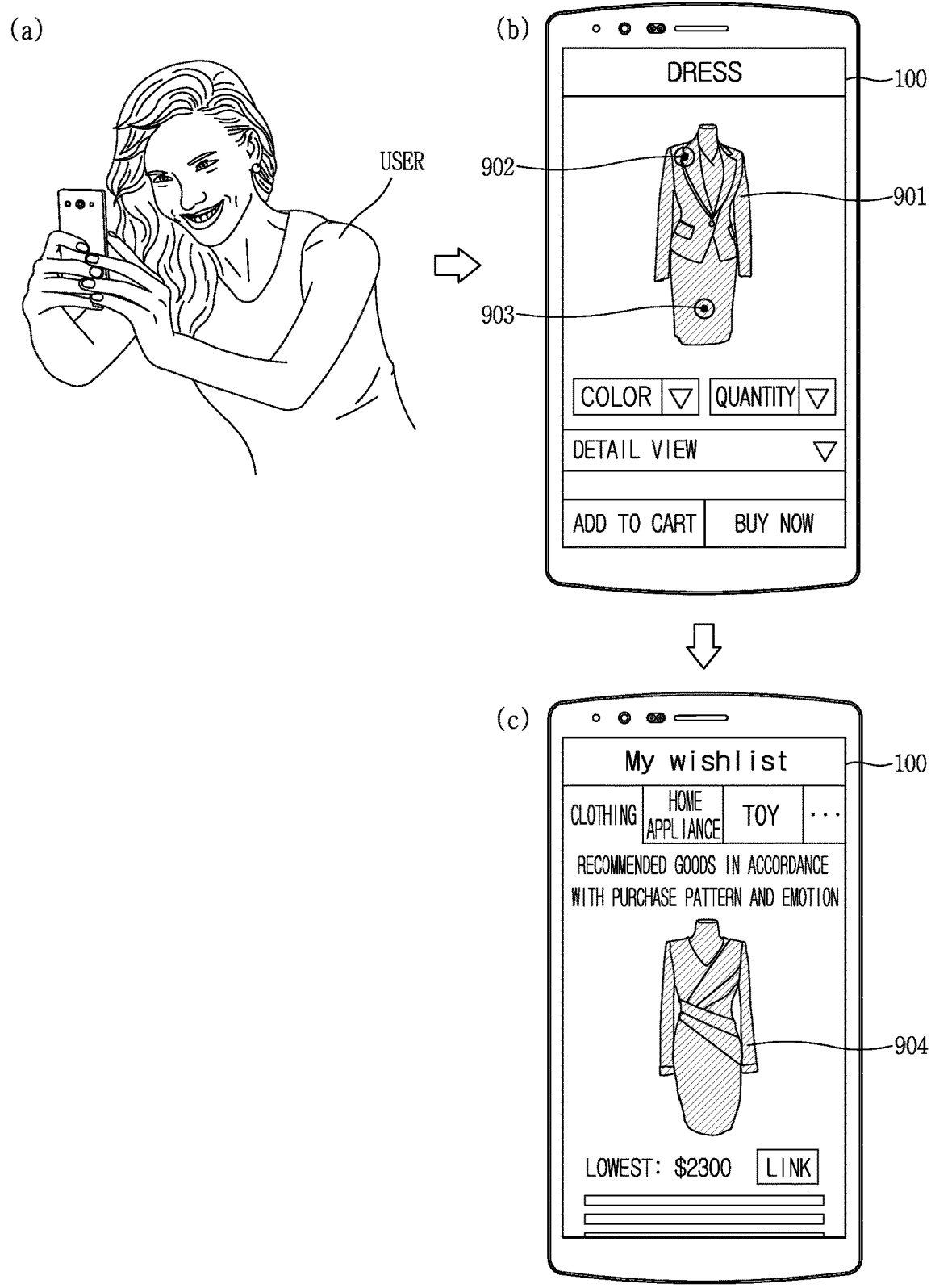

Also, as illustrated in FIG. 9, when the user does mobile shopping through the mobile terminal 100, the camera may be activated to sense a user's facial expression and a portion at which the user gazes. On the basis of the sensed information, goods similar to goods as a target of the mobile shopping may be recommended as illustrated in (c) of FIG. 9.

As described above, the mobile terminal according to the present disclosure generates evaluation information regarding goods on the basis of a user's feeling, whereby honest evaluation information of the user regarding goods may be provided to the user and a third party.

In addition, according to the mobile terminal and the control method thereof, a user's face is utilized as an authentication means, whereby when an authorized user's face is authenticated in payment, payment may be performed. Thus, payment performed by a third party may be prevented. In addition, in the mobile terminal according to the present disclosure, a user's feeling regarding goods is analyzed by utilizing a user's facial image used when payment was performed, whereby evaluation information regarding goods may be generated. In this case, even though the user does not separately create a postscript regarding goods, evaluation information may be automatically generated, and such evaluation information may be made into a database and utilized by the user or shared by other people later.

In addition, the mobile terminal according to the present disclosure generates evaluation information regarding goods or searches for goods on the basis of a user's facial image, gesture, a body index, and the like. Thus, even though separate information such as text or voice is not input, information intended by the user may be input or searched, increasing user convenience.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered to broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a display;
   a camera capturing images;
   a database;
   a wireless communication unit communicating with a wireless communication module located in a store or a point-of-sale (POS) terminal in the store; and
   a controller configured to:
     receive a facial image of a user related to goods from the POS terminal when a payment is made between the mobile terminal and the POS terminal;
     receive a facial image of the user related to goods from the wireless communication module located in the store when the user of the mobile terminal leaves the store without purchasing the goods;
     analyze the facial image received from the POS terminal or the wireless communication module using a face analysis algorithm to obtain facial expression information corresponding to the facial image received from the POS terminal or the wireless communication module according to the analysis;
     generate goods information by associating the obtained facial expression information with other information related to the goods, and storing the goods information in the database;
     search for goods information stored in the database by analyzing a facial image of the user received via the camera based on the face analysis algorithm in order to extract facial expression information corresponding to the facial image of the user received via the camera and feeling information, the feeling information extracted based on the facial expression information corresponding to the facial image received via the camera; and
     cause the display to output the searched goods information stored in the database corresponding to at least the extracted facial expression information or feeling information,
   wherein the analyzing the facial image received via the camera comprises:
     causing the display to output an analysis result for the user to confirm whether the facial expression information corresponding to the facial image received via the camera corresponds to the analysis result when the analysis of the facial image received via the camera is complete;

causing the display to output other feeling items according to the user's response with regard to confirmation; and matching a feeling corresponding to a feeling item selected by the user from the other feeling items to the facial expression information corresponding to the facial image received via the camera based on the facial image received via the camera.

2. The mobile terminal of claim 1, wherein generating the goods information comprises:

obtaining the user's gesture from an image received from the POS terminal;

combining the facial expression information corresponding to the facial image received from the POS terminal or the wireless communication module with the obtained user's gesture to extract the feeling information related to the goods; and matching the extracted feeling information to the other information related to the goods.

3. The mobile terminal of claim 1, wherein the controller is further configured to: sense that the mobile terminal is positioned in the store based on communication between the wireless communication unit and the wireless communication module located in the store; activate at least the camera or a microphone when it is sensed that the mobile terminal is positioned in the store; and generate the goods information by using information received via at least the camera or the microphone.

4. The mobile terminal of claim 3, wherein the wireless communication unit further: receives other goods information from the goods or a Near Field Communication (NFC) tag located in vicinity of the goods; and generates the goods information by using visual information received via the camera or audio information received via the microphone when a time at which the other goods information was received corresponds to a time at which the visual or audio information was received.

5. The mobile terminal of claim 4, wherein the controller further utilizes the received visual or audio information to generate the goods information when a time during which the mobile terminal has remained near the goods satisfies a preset condition.

6. The mobile terminal of claim 1, wherein the received facial image is captured by a camera in the POS terminal and is received from the POS terminal when the payment is made.

7. A method for controlling a mobile terminal, the method comprising:

receiving a facial image of a user related to goods, from a point-of-sale (POS) terminal when a payment is made between the mobile terminal and the POS terminal;

receiving a facial image from a wireless communication module located in a store when the user of the mobile terminal leaves the store without purchasing the goods;

analyzing the facial image received from the POS terminal or the wireless communication module using a face analysis algorithm to obtain facial expression information corresponding to the facial image received from the POS terminal or the wireless communication module according to the analysis;

generating goods information by associating the obtained facial expression information with other information related to the goods and storing the goods information in the database;

searching for goods information stored in the database by analyzing a facial image of the user received via a camera of the mobile terminal based on the face analysis algorithm in order to extract facial expression information corresponding to the facial image of the user received via the camera and feeling information, the feeling information extracted based on the facial expression information corresponding to the facial image received via the camera;

and outputting, via a display of the mobile terminal, the searched goods information stored in the database corresponding to at least the extracted facial expression information or feeling information, wherein the analyzing the facial imago received via the camera comprises:

outputting, via the display, an analysis result for the user to confirm whether the facial expression information corresponding to the facial image received via the camera corresponds to the analysis result when the analysis of the facial image received via the camera is complete;

outputting, via the display, other feeling items according to the user's response with regard to confirmation; and matching a feeling corresponding to a feeling item selected by the user from the other feeling items to the facial expression information corresponding to the facial image received via the camera based on the facial image received via the camera.

8. The method of claim 7, wherein generating the goods information comprises:

obtaining a user's gesture from an image received from the POS terminal;

combining the facial expression information with the obtained user's gesture to extract the feeling information related to the goods; and matching the extracted feeling information to the other information related to the goods.

9. The method of claim 7, further comprising:

sensing that the mobile terminal is positioned in the store based on communication between a wireless communication unit of the mobile terminal and the wireless communication module located in the store;

activating at least the camera or a microphone when the mobile terminal is positioned in the store; and generating the goods information by using information received via at least the camera or the microphone.

10. The method of claim 9, further comprising:

receiving other goods information from the goods or a Near Field Communication (NFC) tag located in vicinity of the goods; and generating the goods information by using visual information received via the camera or audio information received via the microphone when a time at which the other goods information was received corresponds to a time at which the visual or audio information was received.

11. The method of claim 7, wherein the received facial image is captured by a camera in the POS terminal and is received from the POS terminal when the payment is made.

* * * * *